(12) United States Patent
Banerjee et al.

(10) Patent No.: US 11,363,125 B2
(45) Date of Patent: Jun. 14, 2022

(54) SYSTEMS AND METHODS FOR INCREASING RELIABILITY FOR MEDIA DATA DISTRIBUTION

(71) Applicant: Bose Corporation, Framingham, MA (US)

(72) Inventors: Debasmit Banerjee, Everett, MA (US); Michael W. Elliot, North Grafton, MA (US); Mark Westerhoff, Waltham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/568,822

(22) Filed: Sep. 12, 2019

(65) Prior Publication Data
US 2021/0084123 A1   Mar. 18, 2021

(51) Int. Cl.
*H04L 69/164* (2022.01)
*H04L 1/18* (2006.01)
*H04L 1/00* (2006.01)

(52) U.S. Cl.
CPC .......... *H04L 69/164* (2013.01); *H04L 1/0045* (2013.01); *H04L 1/1877* (2013.01)

(58) Field of Classification Search
None
See application file for complete search history.

(56) References Cited

U.S. PATENT DOCUMENTS

| | | | |
|---|---|---|---|
| 7,590,064 B1* | 9/2009 | Zhang | H04W 28/02 370/235 |
| 8,972,815 B1* | 3/2015 | Hwee | H04L 1/0064 714/752 |
| 10,063,261 B1* | 8/2018 | Croxall, II | H04L 1/0041 |
| 2014/0204819 A1* | 7/2014 | Ohta | H04W 72/085 370/311 |
| 2018/0034583 A1* | 2/2018 | Low | H04L 47/33 |
| 2019/0068327 A1* | 2/2019 | Ho | H04L 1/0041 |
| 2020/0314688 A1* | 10/2020 | Kattemane Satyaganapati | H04L 1/1812 |
| 2020/0366324 A1* | 11/2020 | Hong | H04B 1/1027 |
| 2021/0076380 A1* | 3/2021 | Xue | H04W 72/0406 |
| 2021/0274492 A1* | 9/2021 | Yin | H04L 1/1861 |

* cited by examiner

*Primary Examiner* — Lonnie V Sweet
(74) *Attorney, Agent, or Firm* — Bond, Schoeneck & King, PLLC

(57) ABSTRACT

A system and method for increasing reliability for media data distribution using an unreliable protocol within a network of devices is provided. A preemptive packet recovery (PPR) module is provided within a receiver to organize any correctly received payload packets and recover any missing payload packets using a plurality of forward error correction packets. The forward error correction packets include redundant payload data corresponding to the payload packets. If the PPR module is not able to recover a missing payload packet, the PPR module sends a Negative Acknowledgment (NACK) to the provider requesting that the provider resend the missing packet. The system relies on the recovery logic enabled by a packet reconstruction module to recover any missing packets and only requests the resending of missing packets when packets are not recoverable, thus maintaining the increased speed of UDP while increasing the reliability of the data being sent and received.

12 Claims, 16 Drawing Sheets

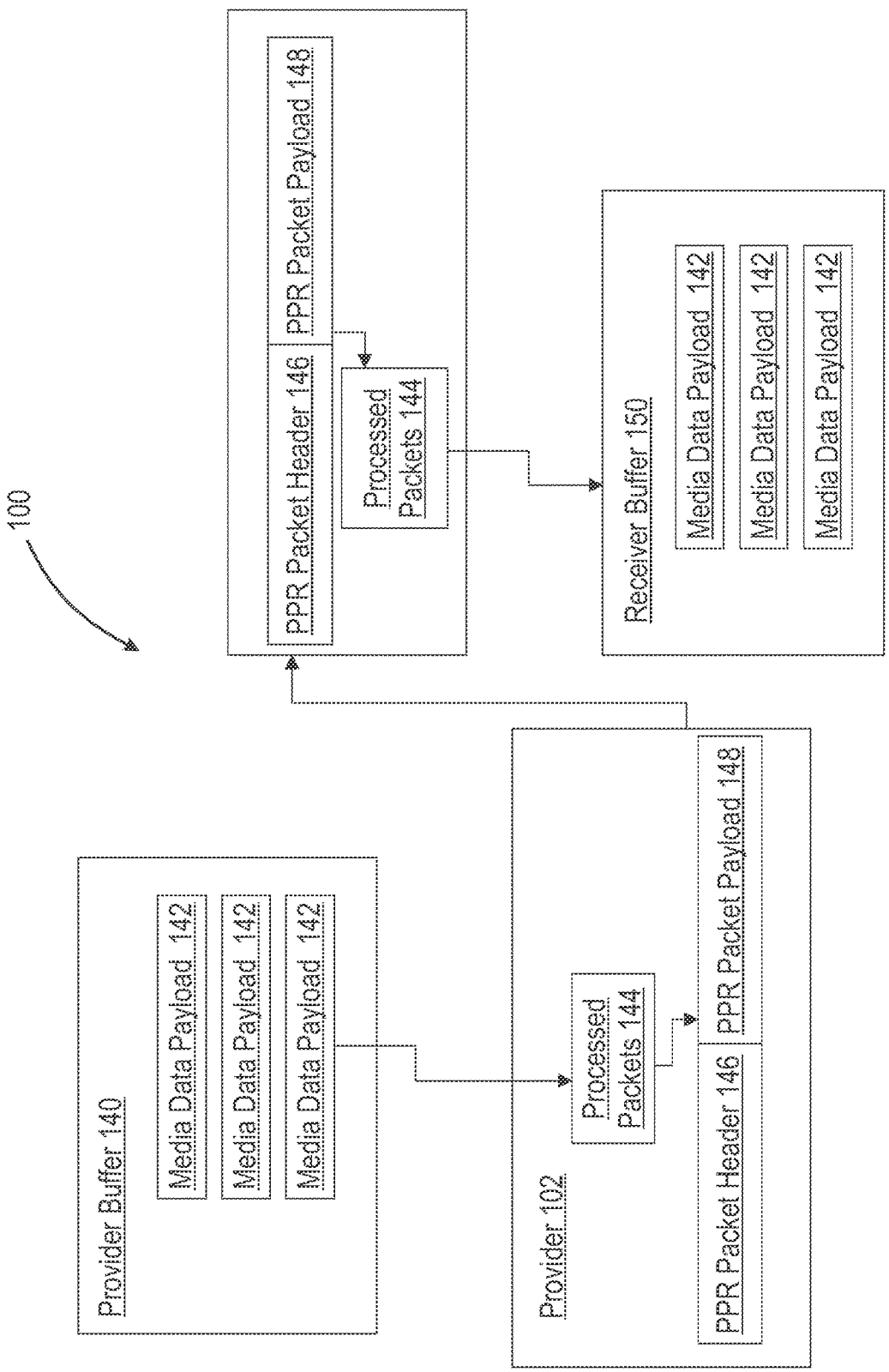

SYSTEMS AND METHODS FOR INCREASING RELIABILITY FOR MEDIA DATA DISTRIBUTION

BACKGROUND

This disclosure generally relates to media systems and methods, in particular, systems and methods for increasing the reliability for media data distribution between devices.

In networking, communications between devices may utilize protocols that are considered reliable or unreliable. Depending on the application, it may be desirable to use a reliable communication protocol for distributing media data between devices, e.g., Transport Communication Protocol (TCP), where acknowledgments are sent when packets are correctly received. Reliable communication protocols carry the benefit of heightened data quality while sacrificing potential speed in the time taken to acknowledge safe receipt of data packets. Additionally, although unreliable communication protocols, e.g., User Datagram Protocol (UDP) do not utilize acknowledgements for safe receipt of packets and therefore may inherently carry less data transfer quality, the lack of acknowledgement packets allow for increase speed in data transfer.

Media systems, for example, home media systems, can utilize a reliable communication protocol, e.g., TCP, to send, receive, or otherwise transfer media data from one device to; however, this limits data transfer rates and may lead decreased audio playback reliability and robustness in the presence of packet loss.

SUMMARY OF THE DISCLOSURE

The present disclosure is directed to improved systems and methods for increasing the reliability of media distribution while using an unreliable communication protocol. For example, a media distribution system may utilize an unreliable protocol such as User Datagram Protocol (UDP) when sending and receiving media data within a network of devices. Due to the unreliable nature of UDP communications, a preemptive packet recovery module is provided within the receiving device that is arranged to organize and reorder any correctly received payload packets at a packet reordering module and reconstruct any missing payload packets using a plurality of forward error correction packets at a packet reconstruction module. The plurality of forward error correction packets include redundant payload data corresponding to the payload packets. In the event the reconstruction module is not able to recover a missing payload packet, the packet retrieval module is arranged to send a Negative Acknowledgment (NACK) back to the provider to request that at least one of the missing payload packets be resent to the receiver. The advantage of such a system is that, while using an unreliable data transfer protocol (e.g., UDP), the system primarily relies on the reconstruction and recovery logic enabled by forward error correction to recover any missing packets (increasing reliability of data transfer) and only requests the resending of missing payload packets when certain packets are not recoverable. This minimizes two-way communications, thus maintaining the increased speed of UDP while increasing the reliability of the data being sent and received.

In one aspect, there is provided a method of increasing reliability for media data distribution, the method including: receiving, from a provider, a plurality of media data packets that comprise a set of sequence numbered payload packets and one or more correction packets, the one or more correction packets including at least some redundant data relative to the set of payload packets, wherein the one or more correction packets are received without sending a request for those one or more correction packets; and, attempting to recover at least one sequence numbered payload packet using the one or more correction packets.

In one example, the step of attempting to recover the at least one sequence numbered payload packet using the one or more correction packets is implemented by a packet reconstruction module using forward error correction (FEC).

In one example, the plurality of media data packets are arranged in a two-dimensional array of media data packets wherein each media data packet corresponds to a row or a column of the two-dimensional array.

In one example, attempting to recover the at least one sequence numbered payload packet using the one or more correction packets further includes attempting to recover a single media data packet in any row or any column of the two-dimensional array of media data packets.

In one example the method further includes attempting to recover at least one additional media data packet based at least in part on the recovery of the single media data packet.

In one example, the method further includes determining a need to send a Negative Acknowledgement (NACK) by receiving packets of larger sequence number.

In one example, the method further includes determining a need to send a Negative Acknowledgement (NACK) by an expiration of a timeout determined by expected and measured packet transfer times.

In one example, if the attempt to recover the single media data packet using the one or more correction packets fails, the method further includes: sending, a Negative Acknowledgement (NACK), from a receiver to the provider, wherein the NACK includes a request that the provider resend at least one resent media data packet where the at least one resent media data packet was not originally received by the receiver.

In one example, the method further includes attempting a second recovery of the at least one additional media data packet based at least in part on the recovery of the single media data packet or the at least one resent media data packet.

In one example, the NACK is inserted into a network buffer of the provider, the network buffer having a total capacity wherein the network buffer is arranged to operate at no more than 75% of the maximum number of queued packets.

In an aspect, there is provided a computer program product stored on a computer readable medium which includes a set of non-transitory computer readable instructions for increasing reliability for media data distribution that when executed on a processor of a receiver is arranged to: receive, from a provider, a plurality of media data packets that comprise a set of sequence numbered payload packets and one or more forward error correction packets, the one or more forward error correction packets including at least some redundant data relative to the set of payload packets, wherein the one or more forward error correction packets are received without sending a request for those one or more forward error correction packets; and, attempt to recover at least one sequence numbered payload packet using the one or more forward error correction packets.

In an example, the attempt to recover the at least one sequence numbered payload packet using the one or more forward error correction packets is implemented by a packet reconstruction module.

In an example, the plurality of media data packets are arranged in a two-dimensional array of media data packets wherein each media data packet corresponds to a row or a column of the two-dimensional array.

In an example, the attempt to recover at least one sequence numbered payload packet using the one or more forward error correction packets further includes an attempt to recover a single media data packet in any row or any column of the two-dimensional array of media data packets.

In an example, the processor is further arranged to attempt to recover at least one additional media data packet based at least in part on the recovery of the single media data packet.

In an example, if the attempt to recover the single media data packet using the one or more forward error correction packets fails, the processor is further arranged to: send, a Negative Acknowledgement (NACK), from a receiver to the provider, wherein the NACK includes a request that the provider resend at least one resent media data packet where the at least one resent media data packet was not originally received by the receiver.

In an example, the processor is further arranged to: attempt a second recovery of at least one additional media data packet based at least in part on the recovery of the single media data packet or the at least one resent media data packet.

In an example, the NACK is inserted into a network buffer of the provider, the network buffer having a total capacity wherein the network buffer is arranged to operate at no more than 75% of the maximum number of queued packets.

In an aspect, a system for increasing reliability for media distribution is provided, the system including a provider arranged within a network, the provider arranged to send a plurality of media data packets that comprises a set of sequence numbered payload packets and one or more forward error correction packets, the one or more forward error correction packets including at least some redundant data relative to the set of payload packets, wherein the one or more forward error correction packets are received without sending a request for those one or more forward error correction packets; and, a receiver arranged with the network, the receiver arranged to receive at least one sequence numbered payload packet and the one or more forward error correction packets, the receiver further arranged to attempt to recover at least one sequence numbered payload packet using the one or more forward error correction packets.

In an example, the attempt to recover the at least one sequence numbered payload packet using the one or more forward error correction packets is implemented by a packet reconstruction module within the receiver.

In an example, the plurality of media data packets are arranged in a two-dimensional array of media data packets wherein each media data packet corresponds to a row or a column of the two-dimensional array.

In an example, the attempt to recover the at least one sequence numbered payload packet using the one or more correction packets further includes an attempt to recover a single media data packet in any row or any column of the two-dimensional array of media data packets.

These and other aspects of the various embodiments will be apparent from and elucidated with reference to the aspect(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

FIG. 3 is a schematic representation of a workflow for generating media data packets according to the present disclosure.

DETAILED DESCRIPTION

Figure 1A:
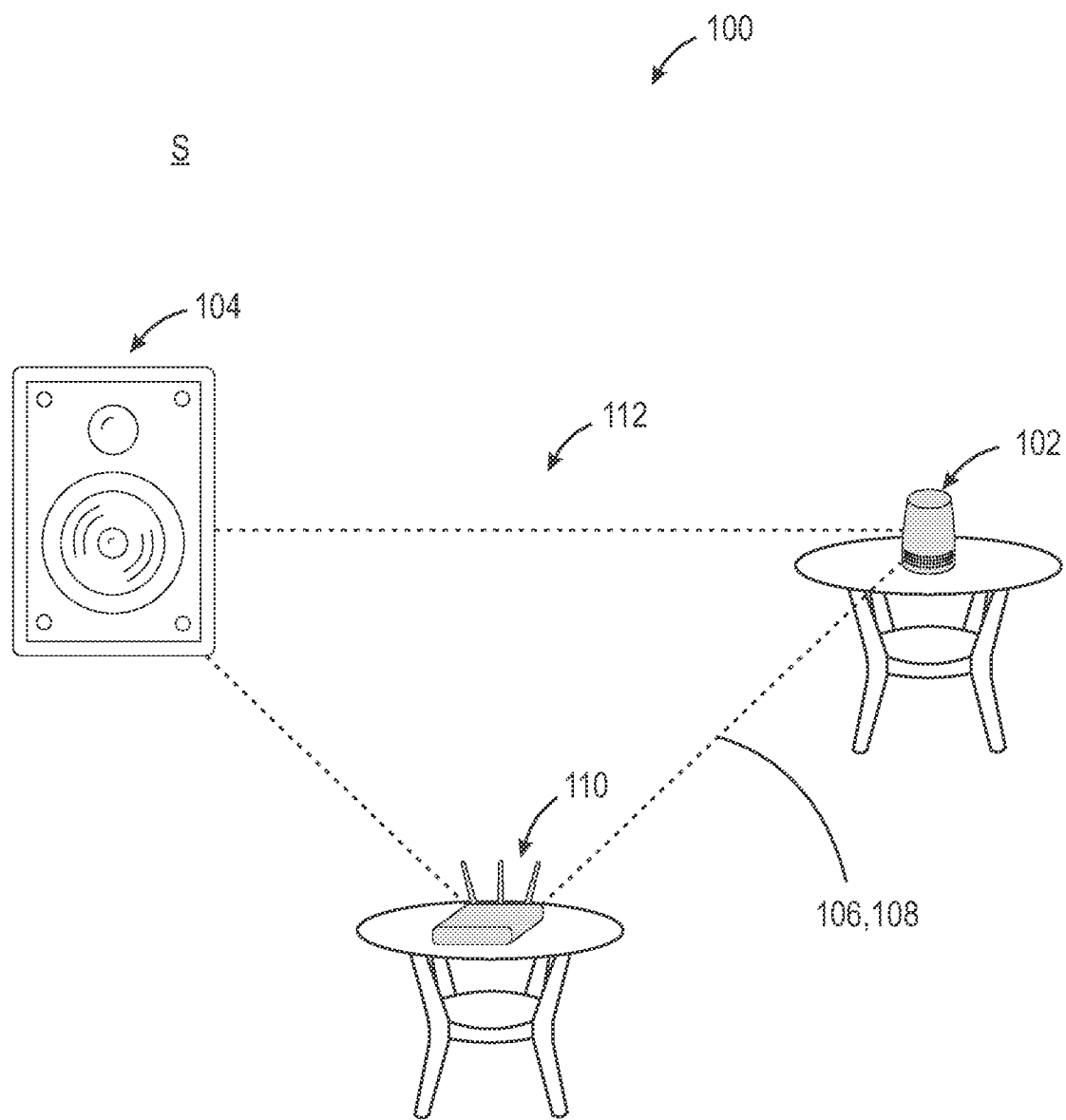
FIG. 1A is a schematic perspective view of a media system within a space according to the present disclosure.

The present disclosure is directed to improved systems and methods for increasing the reliability of media distribution while using an unreliable communication protocol. For example, a media distribution system may utilize an unreliable protocol such as User Datagram Protocol (UDP) when sending and receiving media data within a network of devices. Due to the unreliable nature of UDP communications, a preemptive packet recovery module is provided within the receiving device that is arranged to organize and reorder any correctly received payload packets at a packet reordering module and reconstruct any missing payload packets using a plurality of forward error correction packets at a packet reconstruction module. The plurality of forward error correction packets include redundant payload data corresponding to the payload packets. In the event the reconstruction module is not able to recover a missing payload packet, the packet retrieval module is arranged to send a Negative Acknowledgment (NACK) back to the provider to request that at least one of the missing payload packets be resent to the receiver. The advantage of such a system is that, while using an unreliable data transfer protocol (e.g., UDP), the system primarily relies on the reconstruction and recovery logic enabled by forward error correction to recover any missing packets (increasing reliability of data transfer) and only requests the resending of missing payload packets when certain packets are not recoverable. This minimizes two-way communications, thus maintaining the increased speed of UDP while increasing the reliability of the data being sent and received.

The techniques, systems, and logic provided herein provide numerous benefits. For example, media distribution for media rendering services have traditionally been realized over reliable communication protocols, e.g., Transmission Control Protocol (TCP). TCP is an acknowledgement based protocol which uses a sliding window for data transmission and sends acknowledgments back to the provider device which indicates the last data packet correctly received. The reliability of TCP comes at the cost of unbounded delay (which can sometimes be more than 3 seconds) and overhead from increased packet transmissions, packet reordering, flow control, and guaranteed delivery. Thus, a TCP transmission model requires a system having a receiver with a large enough buffer depth to avoid any underflows or data artifacts. In addition, in audio distribution applications, request response systems typically request acknowledgments upon receipt of a given set of data that add to transmission delays. Thus, utilization of request response systems over TCP for audio distribution is untenable for high data rates and real time audio redistribution scenarios. The present disclosure is related to systems and methods for audio distribution and redistribution which does not include the delays observed in TCP based systems and does not use a response request method, but still provides reliability comparable to a TCP based transmission model. This is accomplished by providing a UDP based transmission model, which does not provide reliability by itself, as UDP systems are a best-effort transport layer protocol and is bare-bones compared to TCP. To support the UDP based transmission model and to increase reliability of the UDP data stream, a preemptive packet recovery module is provided to recover packets when they are lost or delayed. This proactive approach aims to reduce application layer retransmissions and provides a quick turn-around time when packets are missing. When the forward error correction implemented by the preemptive packet recovery module fails to recover packets, an extra layer of reliability is provided by a NACK based approach to recover the missing packet. This is more efficient than using the acknowledgment based approach that TCP uses as a NACK is only sent when there are unrecoverable missing packets and thus reduces network overhead and unnecessary packet transmissions.

Figure 1B:
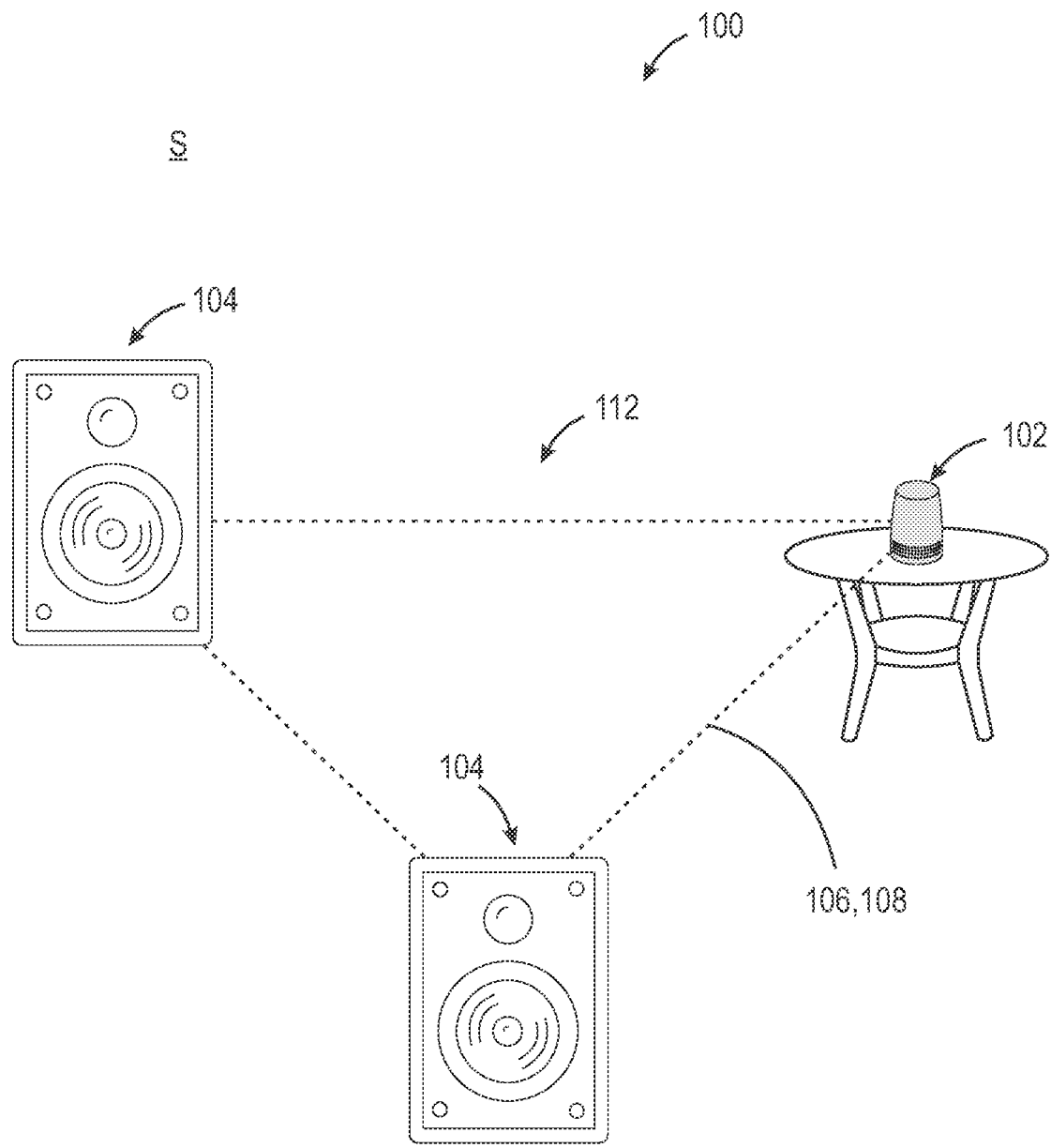
FIG. 1B is a schematic perspective view of a media system within a space according to the present disclosure.

Turning now to the figures, FIGS. 1A-1B illustrate perspective schematic views of a space S within which a media system 100 is provided. Media system 100 includes a provider 102 and a receiver 104. Provider 102 is intended to be a device capable of parsing, encoding, compiling, or otherwise generating media data 106, as will be discussed herein, and sending media data 106 in the form of a plurality of media data packets 108 to a device capable of receiving media data 106, e.g., receiver 104. As shown in FIG. 1, provider 102 is illustrated as a smart hub or smart speaker capable of sending and receiving media data 106; however, it should be appreciated that provider 102 can be any device capable of sending and receiving media data 106 via a wired or wireless data connection. As shown in FIG. 1A, media system 100 can also include a network router 110 arranged to receive and forward data packets, e.g., plurality of media data packets 108, to a plurality of devices, for example, at least provider 102 and receiver 104, via a wired, wireless, or a combination of wired and wireless data connections as will be discussed below, to form a network 112. It should be appreciated that media system 100 does not require a network router 110 as each device, i.e., each provider 102 and each receiver 104 are arranged to communication with each other directly without the need for a network router as illustrated in FIG. 1B. Media data 106 can include data related to audio applications, video applications, imaging applications, audio or video streaming services, or any other use of real time data transfer. All communications between devices within network 112, wired or wireless, utilize a communications protocol selected from: WiFi (IEEE 802.11 a/b/g/n/ac/e), Bluetooth Classic, Bluetooth Low-Energy (BLE), Radio Frequency Identification (RFID), ZigBee, Z-Wave, 6LoWPAN, Thread, WiFi-ah, 2G, 3G, 4G, 5G, LTE Cat 0, LTE Cat 1, LTE Cat 3, Near Field Communications (NFC), or any other wired or wireless protocol capable of sending and receiving data between each device of within network 112.

Figure 2A:
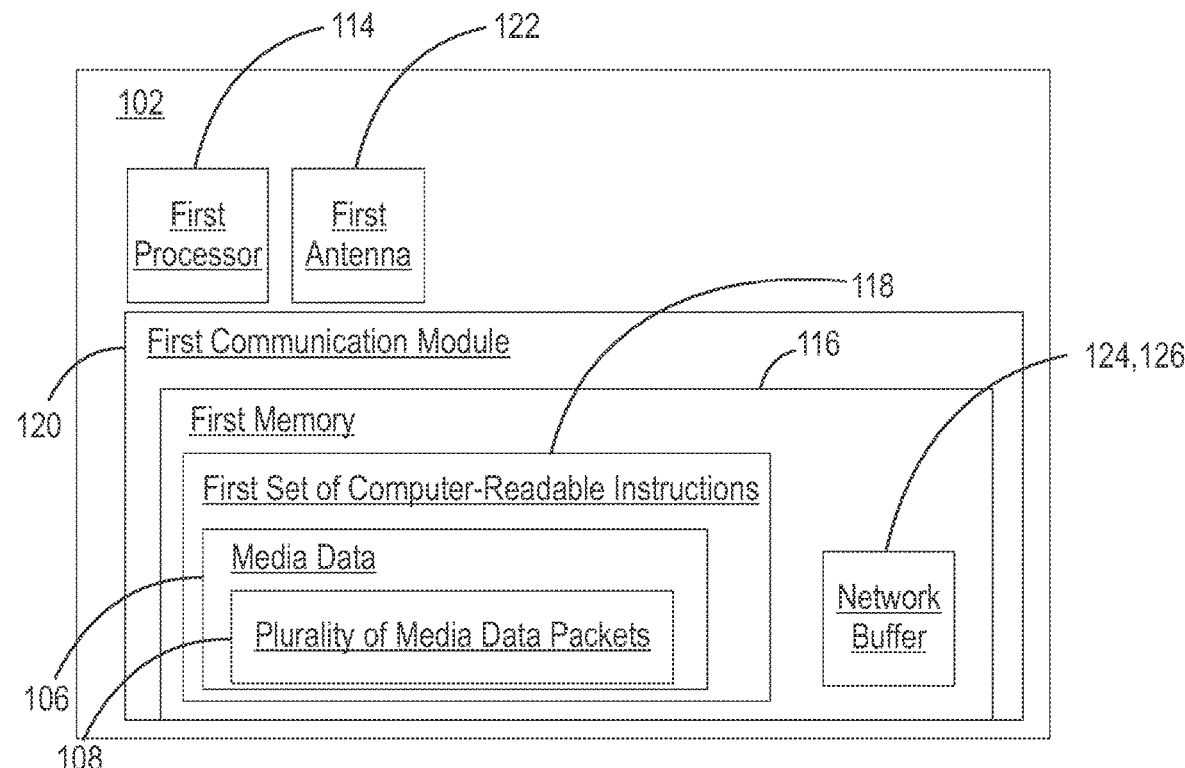
FIG. 2A is a schematic illustration of the components of a provider according to the present disclosure.

As illustrated in FIG. 2A, in one example, provider 102 includes a first processor 114 and first memory 116 arranged to execute and store, respectively, a first set of non-transitory computer-readable instructions 118 to perform the various functions of provider 102 as discussed herein. Additionally, provider 102 includes a first communication module 120 arranged to send and receive wired or wireless data, e.g., media data 106, to other devices within network 112, for example, receiver 104. For the purpose of sending and receiving media data 106 wirelessly, first communication module 120 further includes a first antenna 122. Furthermore, provider 102 also includes a network buffer 124 having a total capacity 126 as discussed below. Network buffer 124 is intended to be a discrete portion of physical memory arranged to be a temporary storage space for information or data being transferred from one device to another, e.g., from provider 102 to receiver 104 over network 112. As will be discussed below, network buffer 124 has a fixed storage capacity in number of packets, i.e., total capacity 126, which corresponds to the amount of temporary storage space available to provider 102 when sending media data to, for example, receiver 104.

Figure 2B:
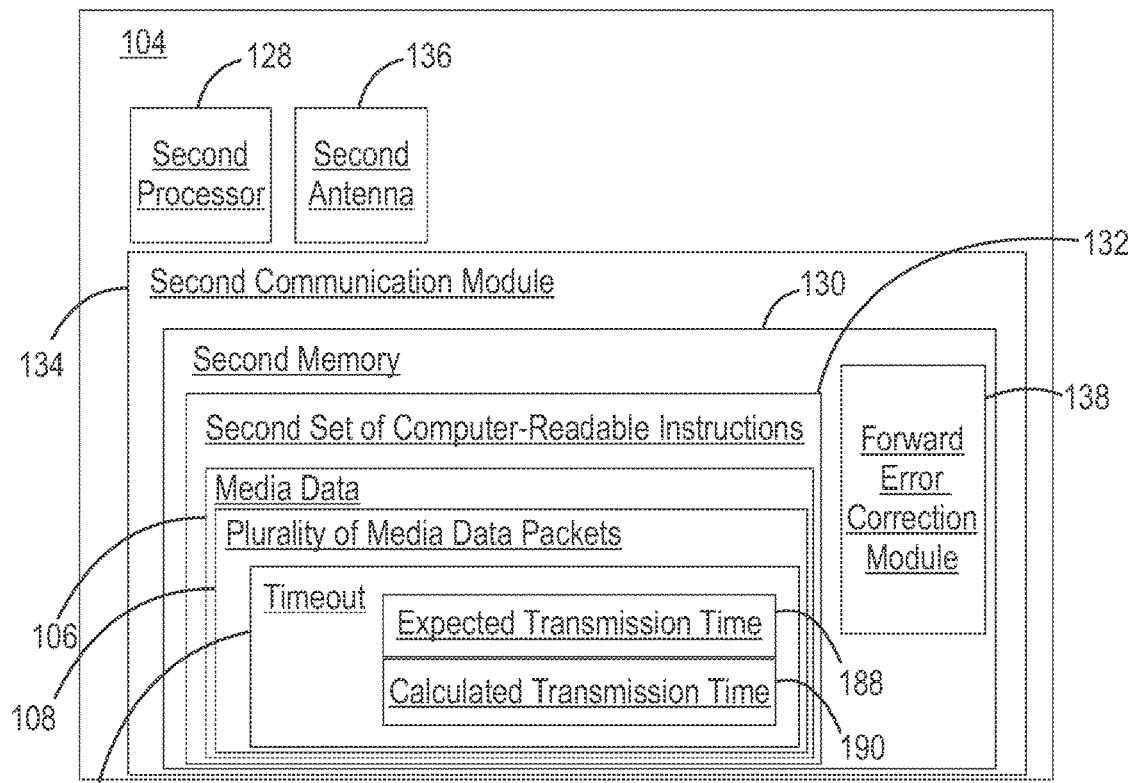
FIG. 2B is a schematic illustration of the components of a receiver according to the present disclosure.

As illustrated in FIG. 2B, receiver 104 similarly includes a second processor 128 and second memory 130 arranged to execute and store, respectively, a second set of non-transitory computer-readable instructions 132 to perform the various functions of receiver 104 as discussed herein. Additionally, receiver 104 includes a second communication module 134 arranged to send and receive wired or wireless data, e.g., media data 106, to other devices within network 112, for example, provider 102. For the purpose of sending and receiving media data 106 wirelessly, second communication module 134 further includes a second antenna 136. Furthermore, receiver 104 also includes a preemptive packet recovery module 138 arranged to analyze the received media data packets of plurality of media data packets 108 sent from provider 102 and determine whether any media data packets of plurality of media data packets 108 have not been correctly received and/or whether they are in the correct order. As will be discussed below in detail, preemptive packet recovery module 138 includes a packet reconstruction module 182 that will attempt to reconstruct and recover any media data packets that have not been correctly received by receiver 104, i.e., a failed data packet 166 (discussed below). Additionally, preemptive packet recovery module 138 also includes a packet retrieval module 184 that can request that any media data packet previously sent but not received be resent by provider 102 to receiver 104. In one example, the communication protocol used to send and receive media data 106 between devices within network 112 is an unreliable communication protocol, for example, User Datagram Protocol (UDP) over a wired or wireless connection.

FIG. 3 illustrates an example schematic representation of the services and workflow related to the initial generation, processing, and sending of each media data packet of plurality of media data packets 108. The services and workflow relating to the generation of media data packets 108 can be executed by a device other than provider 102, e.g., a separate device connected to network 112; however, it should be appreciated that the services and workflow described and illustrated with respect to FIG. 3 can also be executed by provider 102 without the need to receive assembled media data packets from another device within network 112. To this end, provider 102 can further include a provider buffer 140 arranged to temporarily store a plurality of media data payload packets 142. It should be appreciated that provider buffer 140 can be any type of buffer arranged to temporarily store and maintain the order of packets, e.g., media data payload packets 142. In one example, provider buffer 140 is an encoded ring buffer. Provider 102 is arranged to process the media data payload packets 142 into a processed packet 144 which includes a preemptive packet recovery header 146 and a preemptive packet recover payload 148 which substantially forms the payload for each packet sent over the selected protocol, e.g., UDP. Provider 102 is arranged to send, via the wired or wireless connections discussed herein, the processed packets 144 to receiver 104 where they can be further processed by receiver 104 back into media data payload packets 142 for use by the receiver 104. As illustrated receiver 104 also includes a buffer, i.e., receiver buffer 150 is arranged to temporarily store a plurality of media data payload packets 142 after they have been received and processed. It should be appreciated that receiver buffer 150 can be any type of buffer arranged to temporarily store and maintain the order of packets, e.g., media data payload packets 142. In one example, receiver buffer 150 is an encoded ring buffer.

The processed packets 142 of the plurality of media data packets 108 can include a set of sequence numbered payload packets 158 (discussed in detail below and shown in FIGS. 5A-12) and a plurality of forward error correction packets 160 (also (discussed in detail below and shown in FIGS. 5A-12). Each payload packet of the set of sequence numbered payload packets 158 is assigned a monotonically increasing integer value determined by the provider 102 prior to sending the packets via the wired or wireless connection to the receiver 104 which are used by a packet reordering module 162 (discussed below) to determine whether any packets sent by the provider 102 have not been correctly received by the receiver 104. To that end, preemptive packet recovery packet header 146, discussed above, includes information about a particular packet, for example, its sequence number within a particular set of packets; the packet type, e.g., whether the packet contains an audio data, error correction data, negative acknowledgement data, or setup handshake data; the length of the payload; a packet time stamp related to the presentation time of the packet; and the length of padding in the packet. It should be appreciated that prior to or during the establishment of the wired or wireless connections between the provider 102 and receiver 104 as discussed herein, provider 102 and receiver 104 may enter into a handshake exchange where initial settings are exchanged. This can include sending and receiving a synchronization request and sending initial set up data, for example, the packet structure identified in the preemptive packet recovery packet header 146 discussed above.

Figure 4:
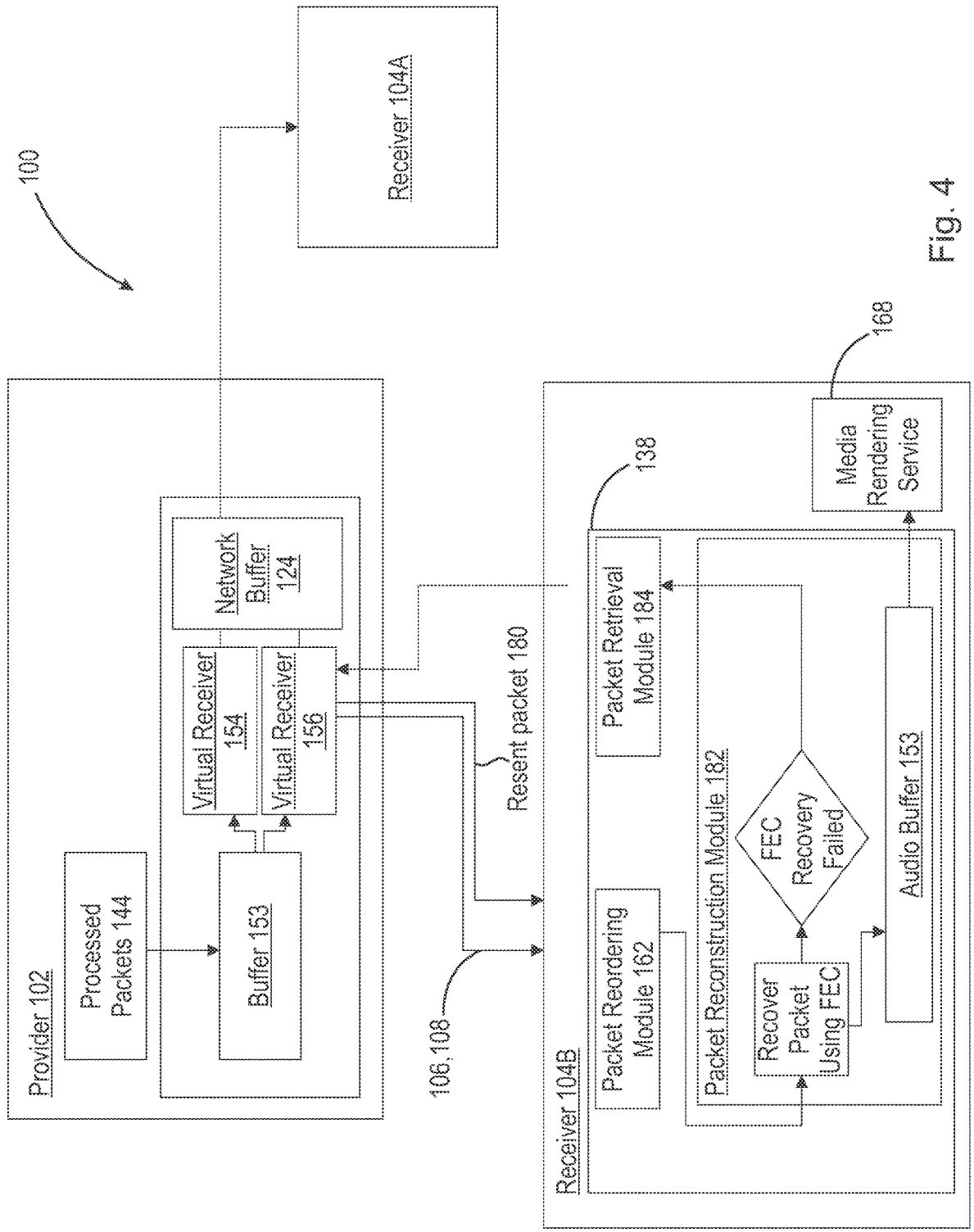
FIG. 4 is schematic representation of a workflow for the sending and recovery of media data packets according to the present disclosure.

FIG. 4 schematically illustrates the services and workflow of media system 100. As illustrated, provider 102 is capable of sending media data 106 and plurality of media data packets 108 to more than one receiver 104 simultaneously, i.e., first receiver 104A and second receiver 104B. It should be appreciated only one receiver is necessary and that media system 100 can include more than two receivers 104. Receivers 104A and 104B (collectively referred to as receivers 104) are arranged to receive plurality of media packets 108 from provider 102. For sake of clarity, only one receiver, i.e., second receiver 104B is schematically expanded to illustrate the components, services, and workflow of receivers 104. Furthermore, provider 102 can include one or more virtual receivers, e.g., first virtual receiver 154 and second virtual receiver 156, which schematically representing each receiver 104 in association with provider 102. Additionally, provider 102 an include an additional buffer 153 which can temporarily store completed data packets of the plurality of media data packets 108 prior to forwarding the media data packets to an available virtual receiver. It should be appreciated that, in one example, this additional buffer 153 may be receiver buffer 150. In one example, the receivers 104 receive, via the wired or wireless connections discussed above, the plurality of media data packets 108 and can attempt to reorder, reconstruct, or otherwise assemble the plurality of media data packets 108 in the order they were sent from provider 102. To that end each receiver 104 includes a preemptive packet recovery module 138 which includes three sub-modules, i.e., packet reordering module 162 (discussed below), packet reconstruction module 182 (discussed below), and packet retrieval module (discussed below) to accomplish the various tasks of preemptive packet recovery module 138 as discussed herein. Upon receipt of plurality of media data packets 108, packet reordering module 162 of preemptive packet recovery module 138 attempts to reorder the plurality of media data packets 108 into their original order as sent from provider 102. The packet reordering module 162 utilizes the sequence numbers contained in the preemptive packet recovery packet header 146 of each packet of plurality of media packets 108 to organize the packets and determine if any packets are missing. If any packets are missing, packet reconstruction module 182 of preemptive packet recovery module 138 is arranged to attempt to recover any missing packets utilizing the plurality of forward error correction packets 160 as discussed below. If packet reconstruction module 182 is unable to recover at least one payload packet of the set of sequence numbered payload packets 158, packet retrieval module 184 of preemptive packet recovery module 138 is arranged to send a negative acknowledgement (NACK) 164 to provider 102 indicating the need to resend the at least one packet that was not received correctly, i.e., failed packet 166. If the packet reconstruction module 182 is able to recover all failed packets 166, or the packet reordering module 162 and/or the packet reconstruction module 182 are able to determine that all packets were properly received, receivers 104 may then forward the reordered payload packets of the set of sequence numbered payload packets 158 to a media rendering service 168 capable of rendering media data 106 obtained from the payload packets of the set of sequence number payload packets 158 into media content, for example, audio, video, or image content related to media data 106. The advantage of the foregoing arrangement is that packets are only resent if they cannot be recovered by the packet reconstruction module 182, thus increasing overall speed of the unreliable communication protocol (UDP) discussed above.

Figure 5A:
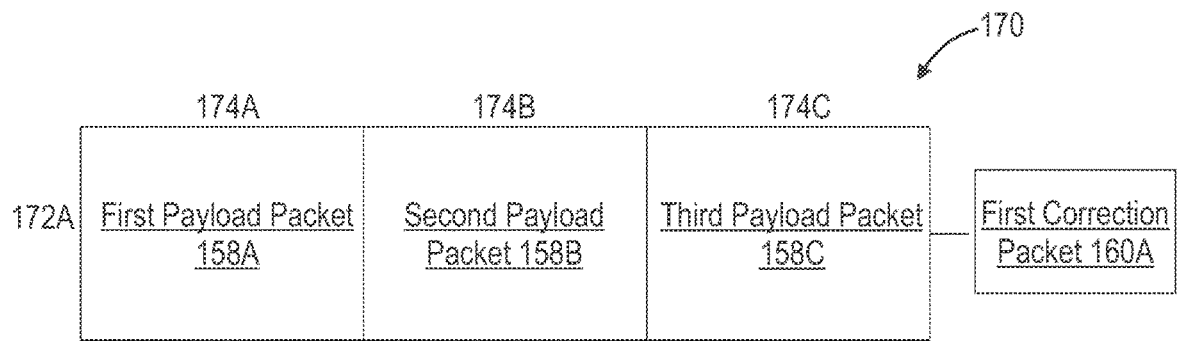
FIG. 5A is a schematic representation of a virtual two-dimensional array according to the present disclosure.
Figure 5B:
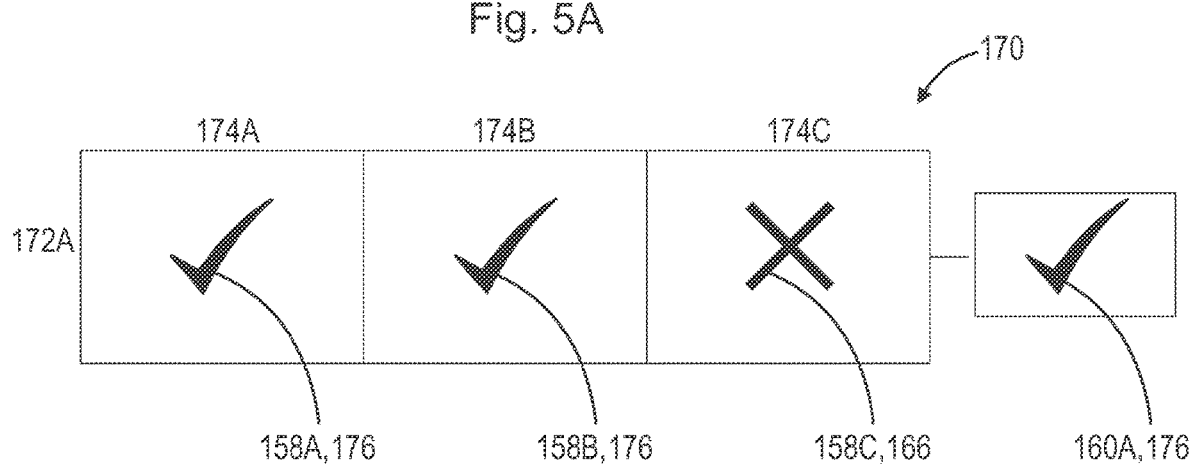
FIG. 5B is a schematic representation of a virtual two-dimensional array according to the present disclosure.
Figure 5C:
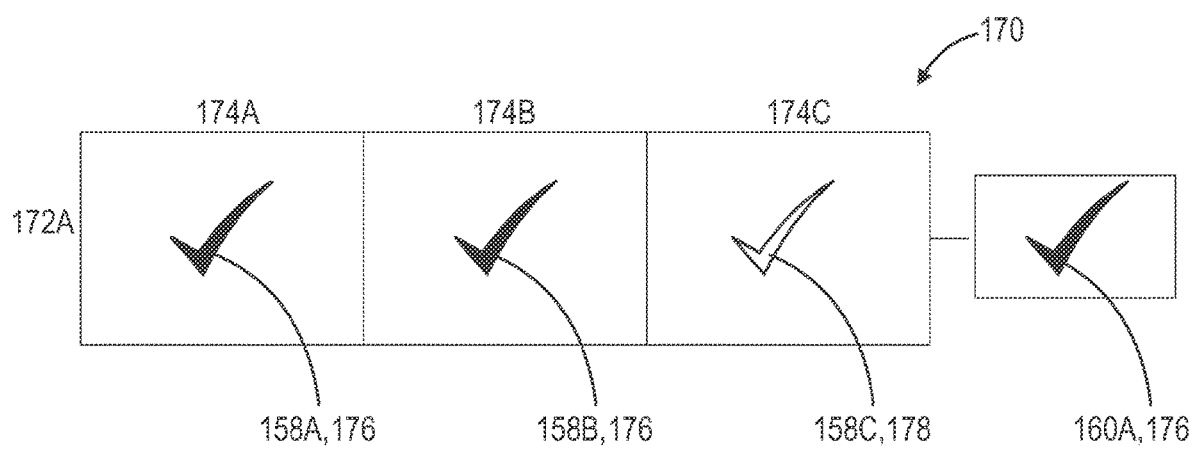
FIG. 5C is a schematic representation of a virtual two-dimensional array according to the present disclosure.
Figure 6:
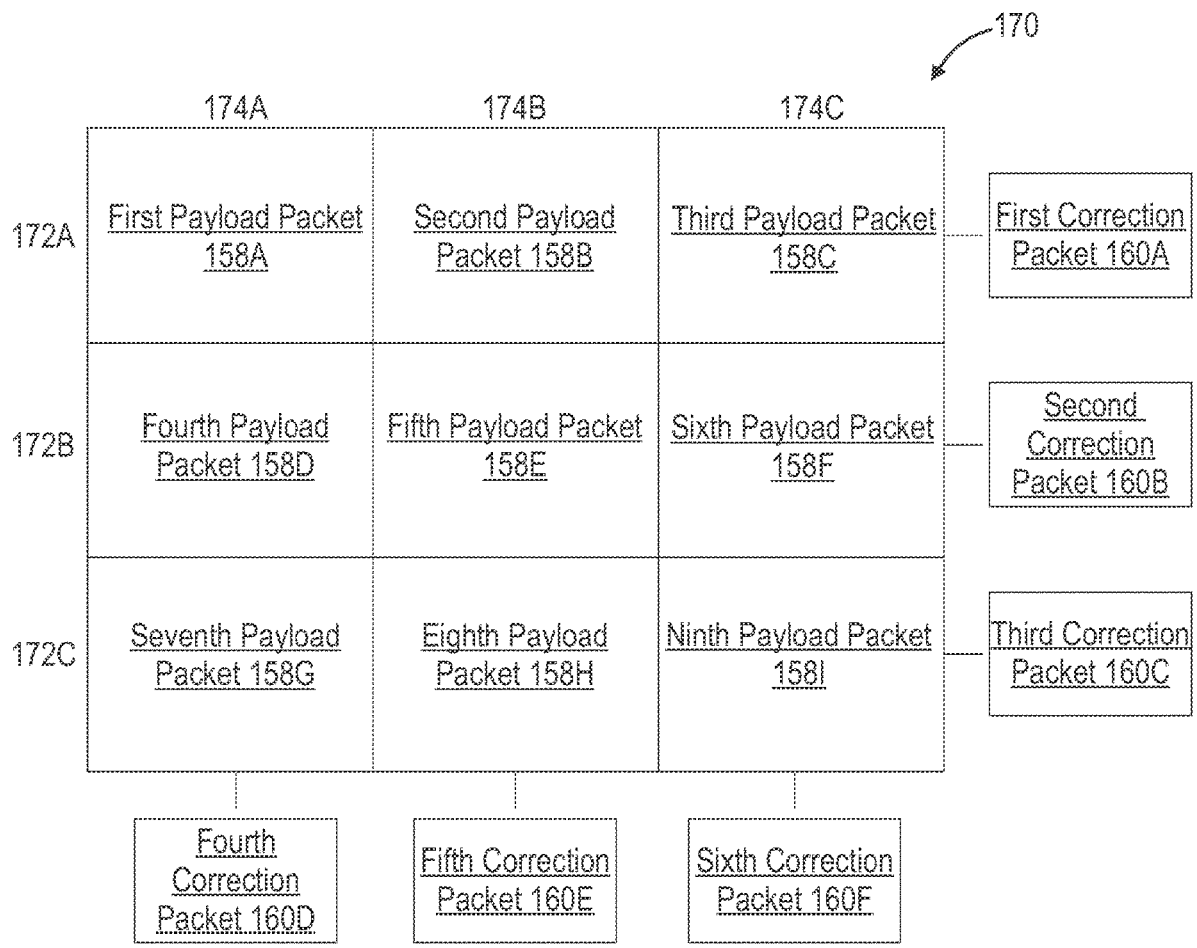
FIG. 6 is a schematic representation of a virtual two-dimensional array according to the present disclosure.

In one example, illustrated in FIGS. 5A-5C, preemptive packet recovery module 138 is arranged to virtually arrange, represent, or otherwise organize the plurality of media data packets 108, e.g., the payload packets from the set of sequence numbered payload packets 158 and forward error correction packets 160, into a two-dimensional array 170. It should be appreciated that in the description that follows the plurality of forward error correction packets 160A-160F will be referred to as correction packets 160A-160F for clarity. Two-dimensional array 170 can be organized into a plurality a rows 172 and a plurality of columns 174. In the example illustrated in FIG. 5A, two-dimensional array 170 includes one row 172A and three columns 174A-174C forming a 1-by-3 grid. The two-dimensional array 170 shown in FIG. 5A organizes multiple packets of information, for example, a first payload data packet 158A of the set of sequence numbered payload packets 158, a second payload data packet 158B of the set of sequence numbered payload packets 158, a third payload data packet 158C of the set of sequence numbered payload packets 158, and a first correction packet 160A associated with first row 172A of plurality of rows 172. Importantly, first correction packet 160A includes redundant data corresponding to the first, second, and third payload packets 158A-158C, respectively. FIG. 5B illustrates an example where during the sending of the plurality of media data packets 108, at least one payload packet is not correctly received by receiver 104. The first correction packet 160A, which contains redundant information for all of the payload packets within the first row 172A, will allow the packet reconstruction module 182 to extrapolate, fill-in, or otherwise recover any one packet of the first payload packet 158A, second payload packet 158B, or third payload packet 158C, as long as at least two payload packets have been recovered within row 172A. For example, as illustrated in FIG. 5B, only two payload packets have been successfully received at receiver 104 and organized in two-dimensional array 170 into a 1-by-3 grid, namely, first payload packet 158A, second payload packet 158B, and first correction packet 160A have been successfully received by receiver 104 (where a successfully received packet 176 is illustrated with a solid check mark and an unsuccessfully received packet, e.g., failed packet 166, is illustrated with a solid "X"). In this example, and as shown in FIG. 5C, packet reconstruction module 182 utilizes the redundant data stored within first correction packet 160A to recover the failed third payload packet 158C turning third payload packet 158C into a recovered packet 178 (illustrated as a hollow check mark). It should be appreciated that the logic utilized to recover a failed packet can be extended to smaller or larger two-dimensional array grids, e.g., to any N-by-M grid where N is the total number of rows and M is the total number of columns in the grid. For example, the recovery logic enabled by packet reconstruction module 182 can be implemented on a two-dimensional array 170 in the form of a 1-by-2 grid of payload packets with the addition of a first correction packet, or a 3-by-3 grid with the addition of six discrete correction packets (one for each row and one for each column in a 3-by-3 grid).

In one aspect, illustrated in FIGS. 6-9B, two-dimensional array 170 is organized in a 3-by-3 grid having three rows 172A-172C; three columns 174A-174C, and six correction packets 160A-160F corresponding to each row and column, respectively. Within the 3-by-3 grid, the packet reconstruction module 182 reorganizes nine payload packets 158A-158I, as well as the six correction packets 160A-160F. Accordingly, the first row 172A includes first payload packet 158A, second payload packet 158B, and third payload packet 158C, as well as a first correction packet 160A containing redundant data related to the payload packets of the first row 172A. the second row 172B includes fourth payload packet 158D, fifth payload packet 158E, and sixth payload packet 158F, as well as a second correction packet 160B containing redundant data related to the payload packets of the second row 172B. Similarly, the third row 172C includes seventh payload packet 158G, eighth payload packet 158H, and ninth payload packet 158I, as well as a third correction packet 160C containing redundant data related to the payload packets of the third row 172C. Additionally, fourth correction packet 160D contains redundant data related to first payload packet 158A, fourth payload packet 158D, and seventh payload packet 158G; fifth correction packet 160E contains redundant data related to second payload packet 158B, fifth payload packet 158E, and eighth payload packet 158H; and, sixth correction packet 160F contains redundant data related to third payload packet 158C, sixth payload packet 158F, and ninth payload packet 158I.

Figure 7:
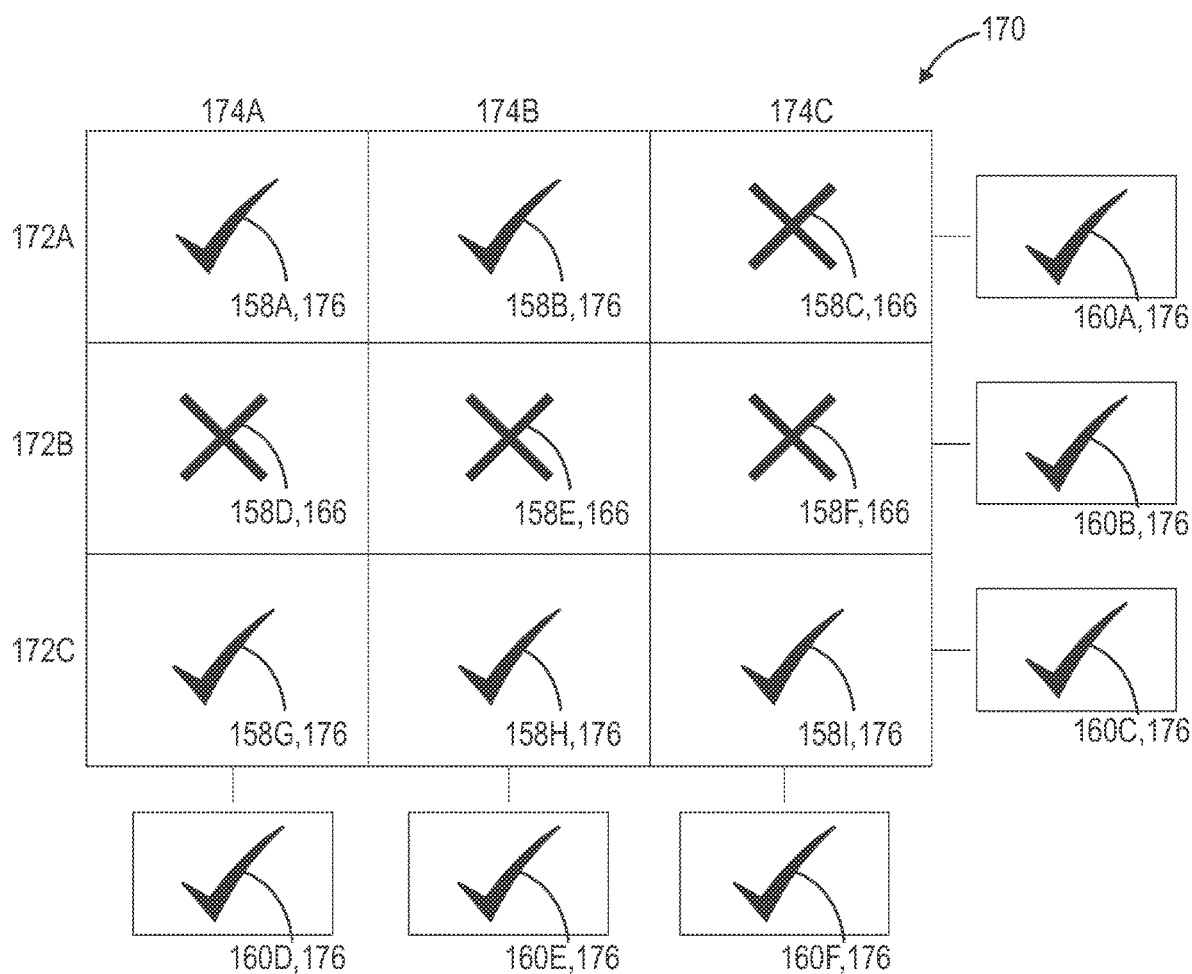
FIG. 7 is a schematic representation of a virtual two-dimensional array according to the present disclosure.

In this example, shown in FIG. 7, third payload packet 158C, fourth payload packet 158D, fifth payload packet 158E, and sixth payload packet 158F have not been correctly received, e.g., are failed packets 166 (illustrated by a solid "X"), while the remaining packets have all been correctly received and organized (illustrated by solid check marks).

During the recovery process illustrated in FIGS. 8A-9B, packet reconstruction module 182 is arranged to calculate or determine, for each row and column, in a series of passes if needed, the number of correctly received packets 176 and the number of failed packets 166. After each determination, packet reconstruction module 182 of preemptive packet recovery module 138 is arranged to recover any single packet of given a row or column where only one failed packet exists. After recovering any single packet of a given row or column where only one failed packet 166 previously existed, packet reconstruction module 182 is arranged to take another pass, if necessary (e.g., it may not be necessary if all packets have been successfully recovered after the first pass), and re-calculate or re-determine if there are any rows or columns with only one failed packet after the first pass and attempt to recover another single packet. This can continue recursively until all packets have been recovered, or there is a row or column with failed packets that cannot be recovered as will be discussed below with respect to FIGS. 10 and 11. It should be appreciated that in each pass, as discussed above, packet reconstruction module 182 can be arranged to recover all recoverable packets found after the first pass and then re-calculate or re-determine if there are any packets that are now recoverable in the second or subsequent passes that previously were not recoverable; or, packet reconstruction module 182 can be arranged to recover only a single failed packet and re-calculate or re-determine if there are any additional failed packets that can be recovered after each single packet has been recovered. For the sake of illustration, FIGS. 8A-9B shown re-calculation after each singular packet recovery.

Figure 8A:
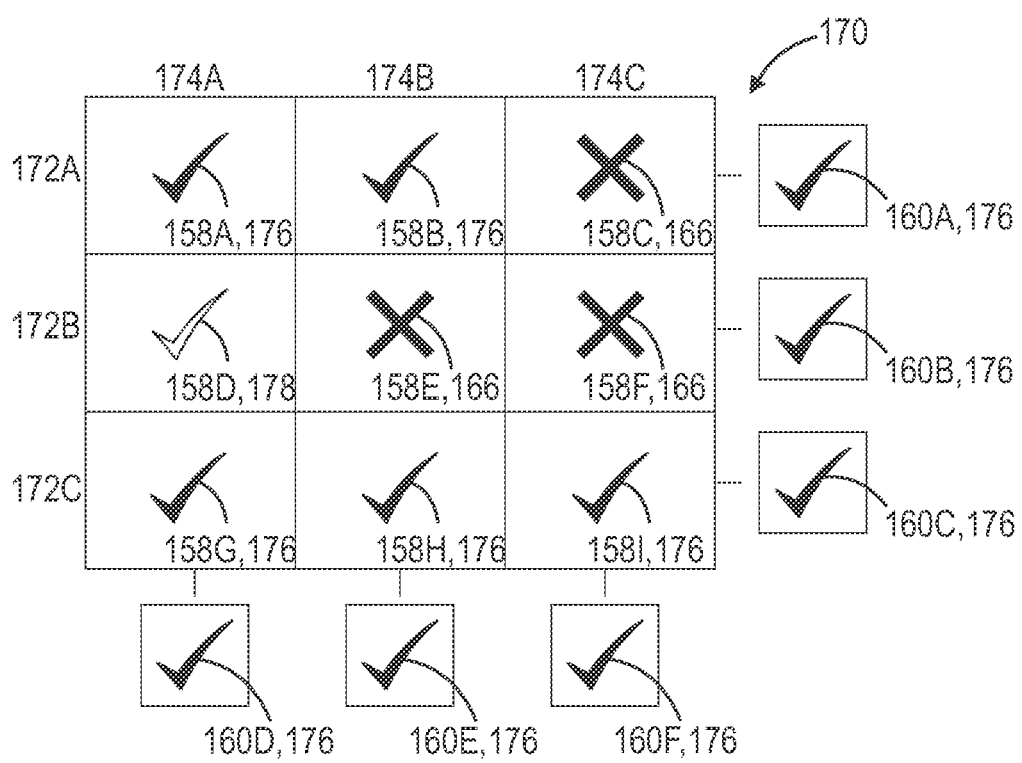
FIG. 8A is a schematic representation of a virtual two-dimensional array according to the present disclosure.

Accordingly, FIG. 8A illustrates a first pass at calculating or determining the integer value of correctly received packets 176 and failed packets 166 in each row and column of two-dimensional array 170. Prior to the first pass (shown in FIG. 7), both first column 174A and second column 174B have a single payload packet that has failed to be received, i.e., fourth payload packet 158D and fifth payload packet 158E, respectively. As discussed above, in the first pass illustrated in FIG. 8A, packet reconstruction module 182 of preemptive packet recovery module 138 can attempt to recover any and all failed packets in any column or any row that only has one failed packet. Thus, in the example shown in FIG. 8A, packet reconstruction module 182 can recover fourth payload packet 158D, fifth payload packet 158E, or both. For the purpose of illustration, FIG. 8A illustrates recovery of fourth payload packet 158D alone in the first pass. In the recovery process shown, packet reconstruction module 182 utilizes the redundant payload data stored in fourth correction packet 160D as well as the data contained in first payload packet 158A and seventh payload packet 158G to recover fourth payload packet 158D. For example, the packet reconstruction module 182 can determine that of the redundant data stored, the data relating to the first payload packet 158A and the seventh payload packet 158G are present within column 174A, and therefore, the data related to fourth payload packet 158D is the failed packet and should be recovered.

Figure 8B:
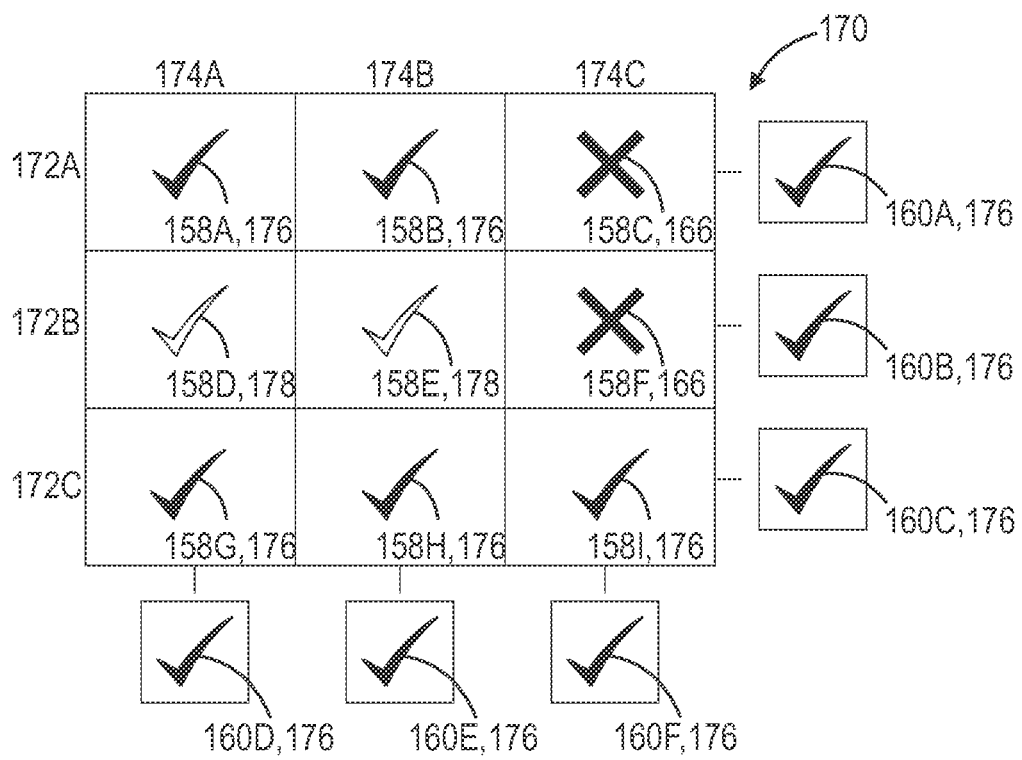
FIG. 8B is a schematic representation of a virtual two-dimensional array according to the present disclosure.

FIG. 8B similarly illustrates a second pass over two-dimensional array 170 after the first pass, in other words, after fourth payload packet 158D has been successfully recovered (illustrated by a hollow check mark). As shown and discussed above, second column 174B also contains only one failed packet 166, e.g., fifth payload packet 158E has not been received. Thus, in the second pass, packet reconstruction module 182 utilizes the redundant payload data stored in fifth correction packet 160E as well as the data contained in second payload packet 158B and eighth payload packet 158H to recover fifth payload packet 158E (illustrated as a hollow check mark).

Figure 9A:
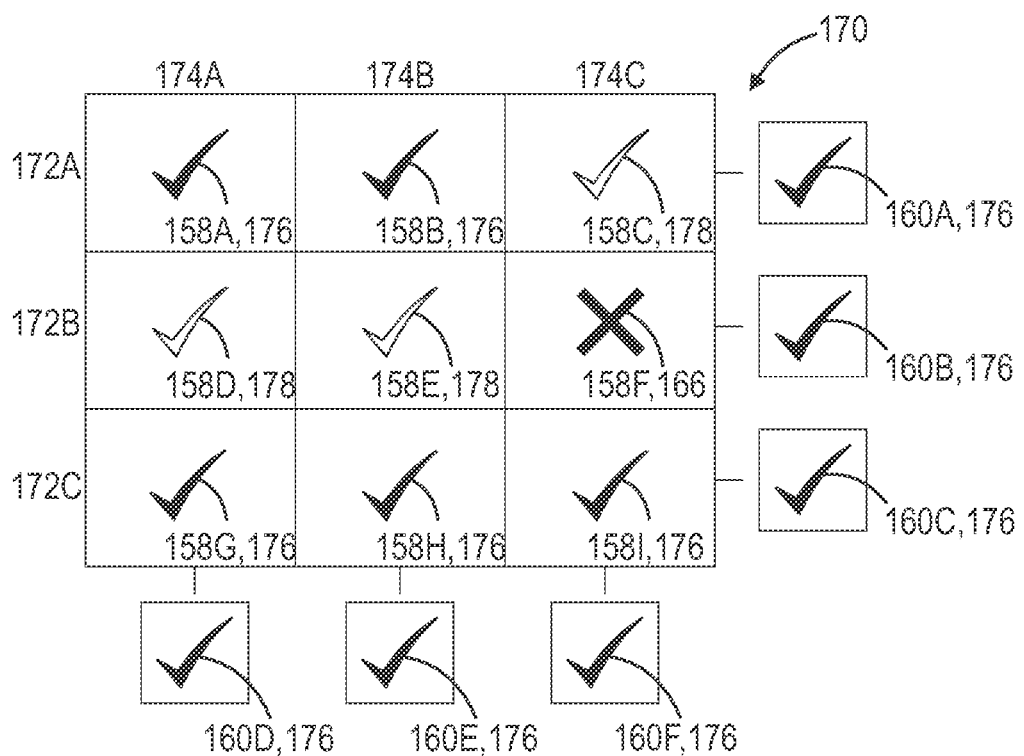
FIG. 9A is a schematic representation of a virtual two-dimensional array according to the present disclosure.

In the third pass, illustrated in FIG. 9A, now that fourth payload packet 158D and fifth payload packet 158E have been successfully recovered (illustrated as hollow check marks), second row 172B now contains only one failed packet 166, i.e., sixth payload packet 158F, which can now be recovered. Thus, packet reconstruction module 182 can utilize the redundant payload data stored in second correction packet 160B corresponding to second row 172B as well as the data contained in recovered fourth payload packet 158D and recovered fifth payload packet 158E to recover sixth payload packet 158F.

Figure 9B:
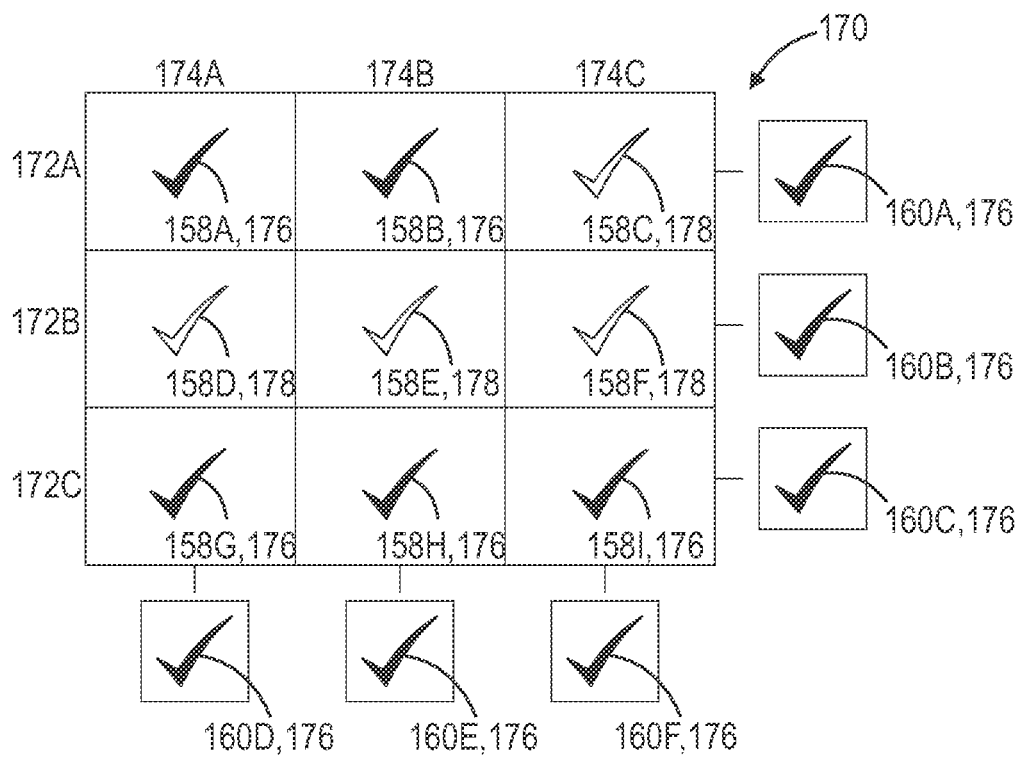
FIG. 9B is a schematic representation of a virtual two-dimensional array according to the present disclosure.

In the fourth pass, illustrated in FIG. 9B, now that sixth payload packet 158F has been recovered, third column 174C now contains only one failed packet 166, i.e., third payload packet 158C. Thus, packet reconstruction module 182 can utilize the redundant payload data stored in sixth correction packet 160F corresponding to third column 174C as well as the data contained in recovered sixth payload packet 158F and the originally received ninth payload packet 158I to recover third payload packet 158C. After this fourth pass, all failed packets originally contained in the virtual 3-by-3 grid of the example shown in FIG. 7 have been successfully recovered and all media data packets 108 may be forwarded to the media rendering service 168 (discussed above with respect to FIGS. 3 and 4). It should also be appreciated that in the event all payload packets within a given row 172 or column 174 are correctly received and the corresponding correction packet for that row or column is not received, packet reconstruction module 182 can utilize the data from the payload packets within that given row or column to recover the corresponding correction packet for that row or column.

Figure 10:
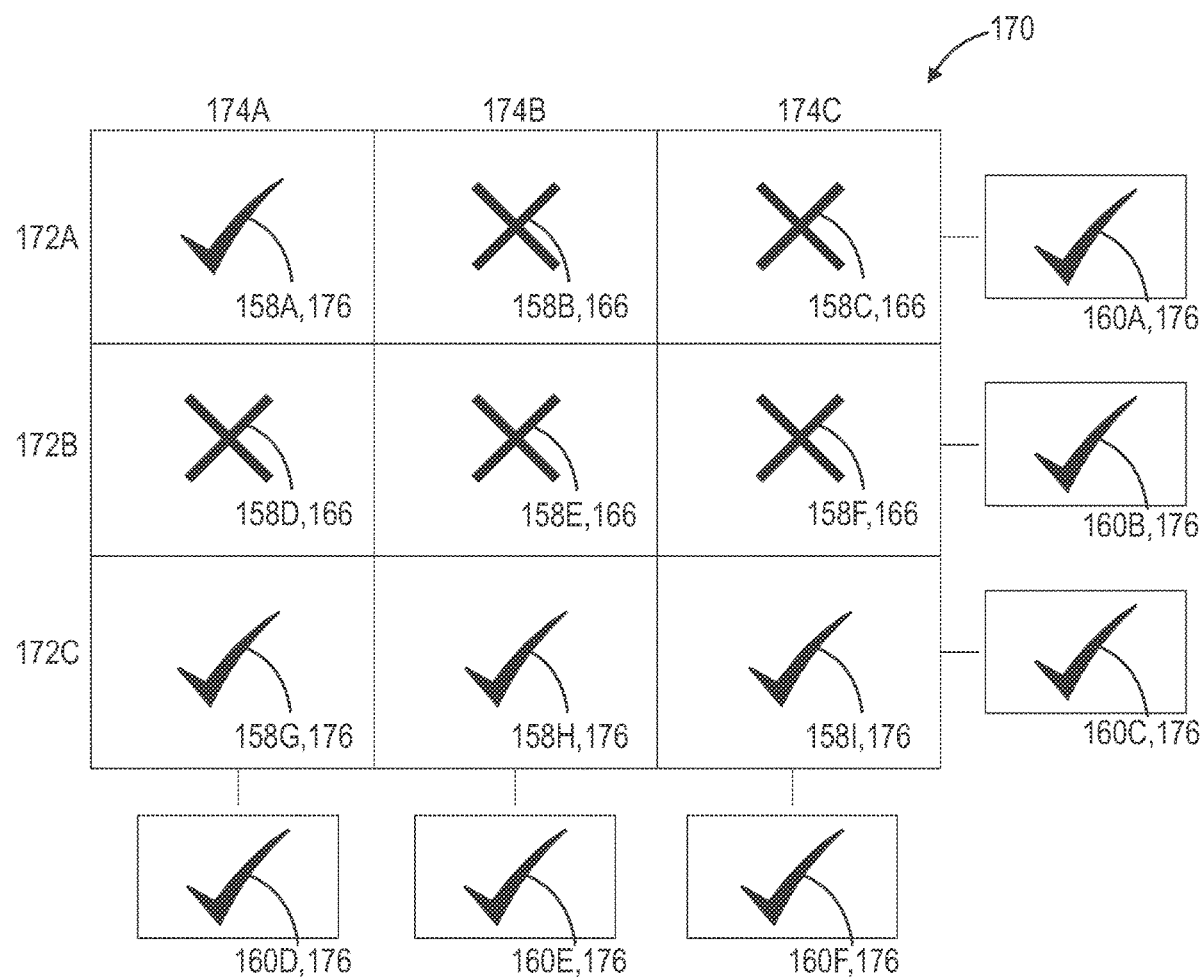
FIG. 10 is a schematic representation of a virtual two-dimensional array according to the present disclosure.
Figure 11:
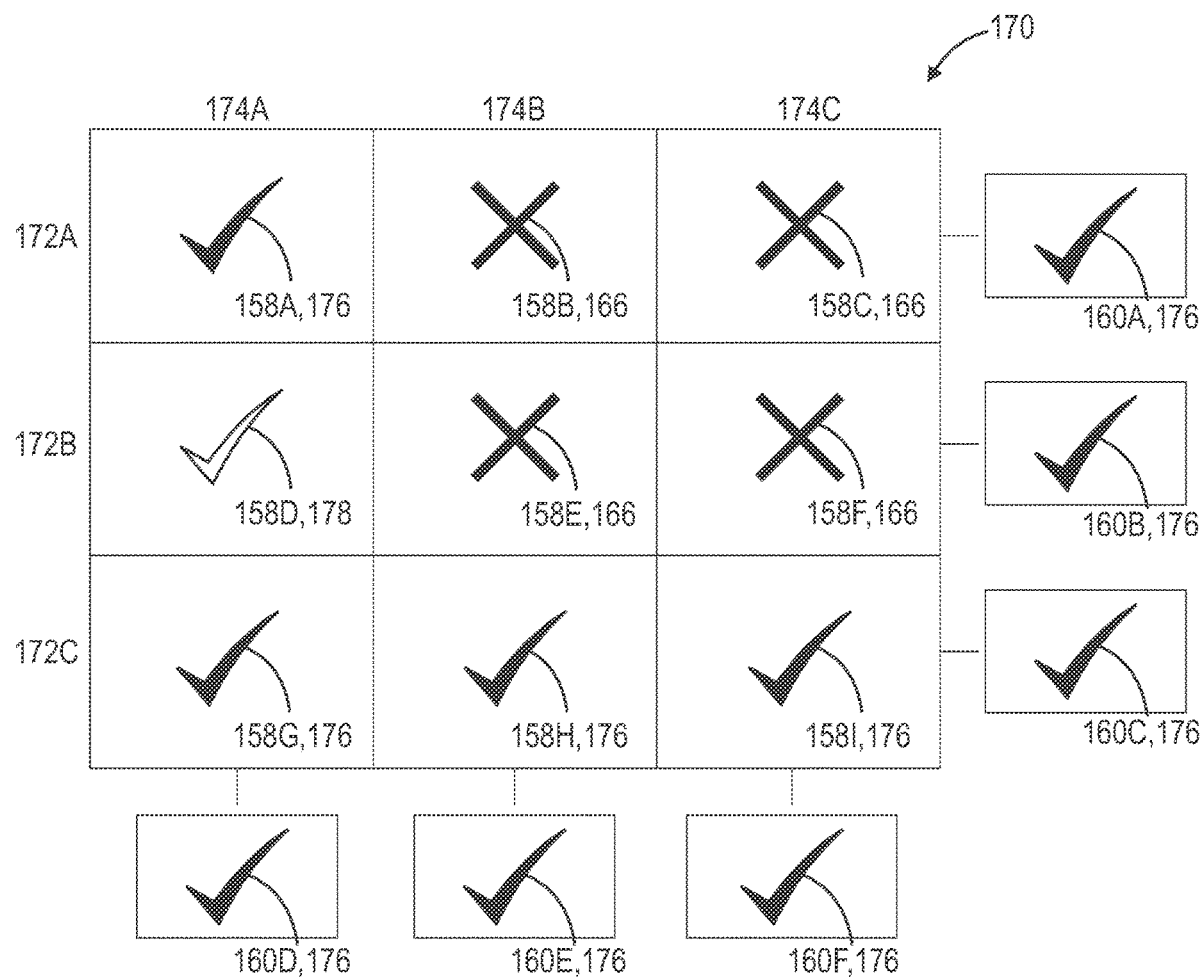
FIG. 11 is a schematic representation of a virtual two-dimensional array according to the present disclosure.

As illustrated in FIGS. 10 and 11, the original 3-by-3 grid can contain an arrangement of correctly received packets 176 and failed packets 166 which will not allow the logical recovery process discussed above to recover any and/or all payload packets originally sent by provider 102. As shown in FIG. 10, for example, second payload packet 158B through sixth payload packet 158F have not been correctly received by receiver 104, e.g., are failed packets 166, while the rest of the packets of the 3-by-3 grid have been successfully received. In this arrangement, although fourth payload packet 158D can be recovered in the first pass by utilizing fourth correction packet 160D (shown as a hollow check mark in FIG. 11), the second pass will reveal that no further recovery of second payload packet 158B, third payload packet 158C, fifth payload packet 158E, or sixth payload packet 158F is possible. In other words, after the first pass, packet reconstruction module 182 is not capable of recovering any additional payload packets utilizing the recovery logic discussed above. In this example, once packet reconstruction module 182 has determined in the first or any subsequent pass over the packets arranged in the 3-by-3 grid that no further packets can be recovered and that there are still failed packets in the two-dimensional array 170, a request must be sent to the provider 102 to resend one or more missing packets corresponding to the failed packets 166. As will be discussed below, this request is sent by packet retrieval module 184 of preemptive packet recovery module 138.

Figure 12:
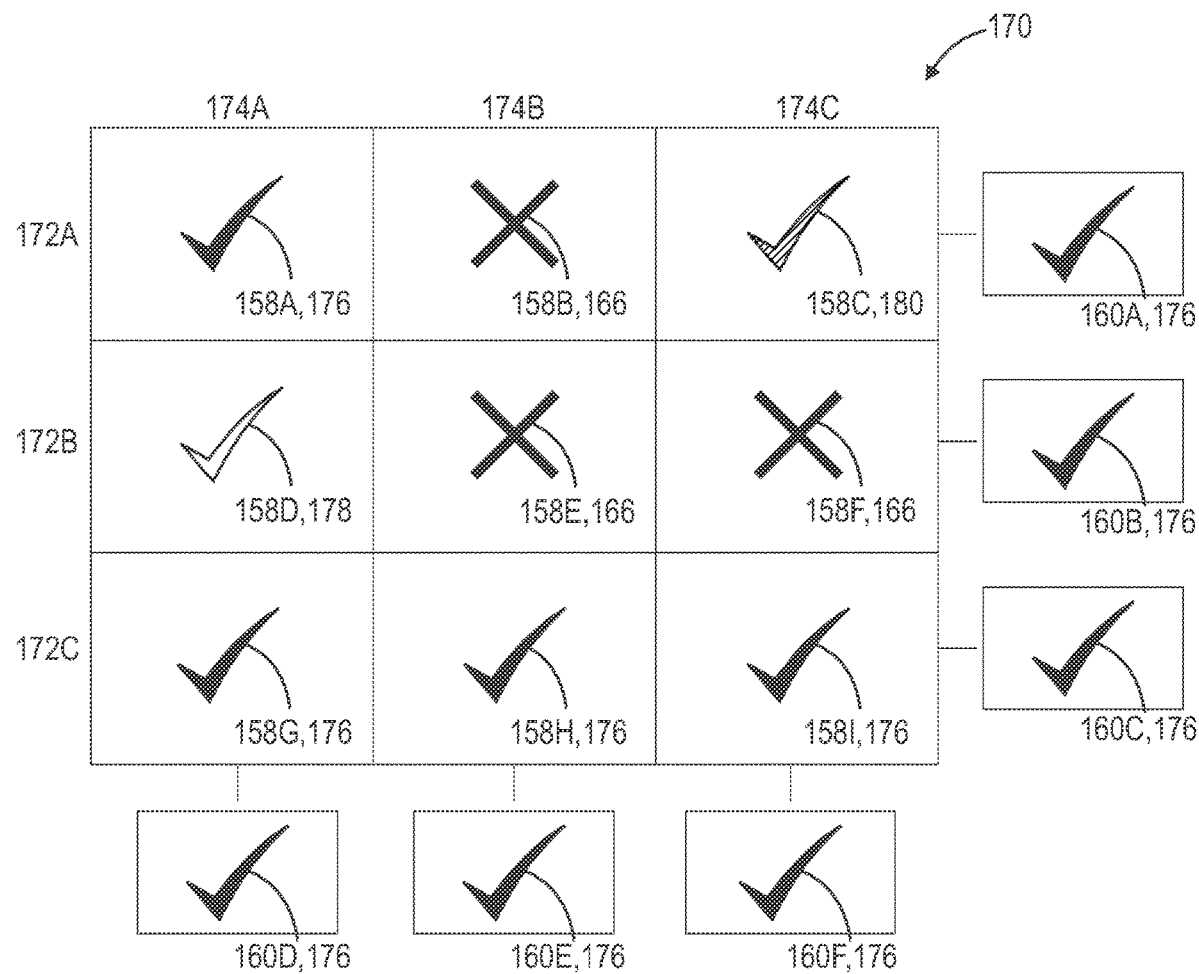
FIG. 12 is a schematic representation of a virtual two-dimensional array according to the present disclosure.

The request can take the form of a Negative Acknowledgement (NACK) 164 as discussed above with respect to FIG. 4. Additionally, when one or more failed packets 166 cannot be recovered using the logic described above, packet retrieval module 184 makes a determination as to the most efficient failed packet 166 to recover. For example, in the arrangement illustrated and described with respect to FIG. 11, after fourth payload packet 158D has been successfully recovered and second payload packet 158B, third payload packet 158C, fifth payload packet 158E, and sixth payload packet 158F are still failed packets 166, packet retrieval module 184 can choose to send a NACK 164 which contains a request that provider resend second payload packet 158B, third payload packet 158C, fifth payload packet 158E, or sixth payload packet 158F. It should be appreciated that more than one failed packet 166 can be resent using the NACK 164. In the example described, it does not matter which packet or packets are resent as the addition of a single resent packet will be sufficient to recover all remaining packets in subsequent passes. For example, as shown in FIG. 12, packet retrieval module 184 can choose to request, via a NACK 164, to instruct provider 102 to resend third payload packet 158C to receiver 104 (where the resent packet 180 is illustrated as a check mark with cross-hatchings). Once received, the recovery logic can be used on the second pass to recover sixth payload packet 158F from sixth correction packet 160F and resent third payload packet 158C. Although not illustrated, it should be appreciated that the recovery logic implemented by packet reconstruction module 182, as discussed above, can continue recursively to recover the fifth payload packet 158E on the third pass, and finally the second payload packet 158B on the fourth pass, respectively. For example, the third pass can utilize packet reconstruction module 182 to recover fifth payload packet 158E using second recovery packet 160B, recovered fourth payload packet 158D and recovered sixth payload packet (from the first pass described above). Once the fifth payload packet 158E has been successfully recovered, the fourth pass can recover second payload packet 158B using fifth correction packet 160E as well as recovered fifth payload packet 158E and originally received eighth payload packet 158H, thus completing the 3-by-3 grid. Once packet reconstruction module 182 and packet reordering module 162 have determined that all payload packets are present and in the proper order, it may forward the media data packets 108 to a media rendering service 168 to be used to, for example, render audio, video, or images relating to media data 106. It should be appreciated that packet retrieval module 184 can be arranged so that it selects the singular or multiple packets that need to be resent such that upon receiving the resent packet 180, the remaining failed packets can all be recovered.

Additionally, the need to send NACK 164 can be determined based at least in part on the sequence number of a particular failed packet 166 along with the sequence number of the last correctly received packet. For example, if the last packet received has a sequence number of 1010, and packet retrieval module 184 is aware of a failed packet 166 with a sequence number of, e.g., 1000, this may be seen as an early indication that a NACK 164 should be sent requesting a resent packet 180 containing the packet associated with sequence number 1000. In other words, should the last received packet have a larger sequence number than a failed packet, this may trigger or otherwise indicate the need to preemptively send a NACK 164 from receiver 102 to provider 104 requesting the missing packet prior to determining whether the missing packet is recoverable using the recovery logic described above. The threshold for the required difference between the sequence number of the missing packet and the sequence number of the last received packet that triggers a preemptive NACK 164 can be tuned, for example, should this threshold be set at 10 packets as recited in the example above, and NACKs 164 are sent for any missing packet where 10 sequential packets larger than the sequence number for the missing packet have been received and the missing packet is recoverable using the logic above, then there may be a significant amount of duplicate packets being resent by provider 102 in response to a significant amount of NACKs 164 sent by receiver 104. If there are a substantial number of duplicates of packets, the threshold may be increased to, e.g., 50 sequence numbers larger for preemptive NACKs 164 to be sent. By increasing the threshold for the difference in sequence numbers, the number of duplicates should decrease as some or all of the missing packets may also be recovered successfully using the recovery logic discussed herein.

The determination of when a NACK 164 is required can also be made based on a calculated timeout 186. As shown in FIG. 2B, calculated timeout 186 utilizes an expected transmission time 188 and a measured transmission time 190 for each packet sent and received between provider 102 and receiver 104 to calculate timeout 186 within the current network environment. These timeouts 186 or timeout thresholds must be tuned for network hardware and network environment in order to reduce duplicate packets but ensure minimal unrecoverable packets. Once this timeout is reached a NACK 164 is necessary. In one example, provider, when generating each data packet of plurality of data packets 108 includes an expected transmission time 188 corresponding to the expected transmission time of each packet. The expected transmission time can be selected by computing or estimating a maximum transmission time illustrated by the following:

$$\text{MaximumTransmissionTime} = \text{Max}(\text{TransmissionTime}(packet_i), \text{TransmissionTime}(packet_{i-1}), \ldots \text{TransmissionTime}_{i-n})$$

where i denotes the current packet sequence number and n is a tunable or dynamic historical maximum integer value or other dynamic integer value.

In the above example, a timer may be set for an expected packet receipt maximum of 1.x*(MaximumTransmissionTime), where "x" is an integer that can be a fixed integer or a dynamically selected integer based at least in part on given network or the hardware utilized for wired or wireless communication within the network. In this example, measured packet transmission times 190 for, e.g., four separate packets could include, 100 ms, 150 ms, 50 ms, and 20 ms, respectively. It should be appreciated that other transmission times are possible, for example, transmission times shorter than 20 ms, e.g., 15 ms, 10 ms, 5 ms, and transmission times greater than 150 ms, e.g., 175 ms, 200 ms, etc., may be measured. Here, when the fourth packet is received having a measured transmission time 190 of 20 ms, receiver can determine that based on these four received packets, the current packet receipt maximum for that set of measured transmission times 190 is 150 ms. The expected packet receipt maximum discussed above could then be recursively tuned using the 150 ms maximum value in the formulas discussed above, e.g., maximum expected transmission time=1.x*(150 ms). Now, calculated timeout 186 can utilized this time period to establish when a NACK 164 is required, e.g., when the measured transmission time 190 of any given packet exceeds the maximum expected transmission time disclosed above, a NACK 164 can be preemptively sent.

The NACK 164, described above, may be sent to provider 102 and be placed within network buffer 124 with total capacity 126. Network buffer 124 may be a ring buffer or other equivalent buffer that utilizes a last-in, last-out buffer prioritization. In other words, the order in which data enters network buffer 124 is the order in which data leaves network buffer 124. Thus, when a NACK 164 is received containing a request to resend any failed packet 166 to receiver 104, the network buffer 124 is arranged to receive the request and process it after and along with any media data packets 108 that had already entered network buffer 124. As such, since any NACK packet must follow any packets that have already entered network buffer 124 prior to receiving NACK 164, it is desirable to reduce the amount of maximum data that can be within network buffer 124 at any given time in order to reduce the time it takes for the network buffer 124 to send or otherwise process any data ordered before NACK 164 to reduce the time it takes to resend a resent packet 180 to receiver 104. This reduction of the maximum data that can sit within network buffer 124 is accomplished by capping or limiting the network buffer 124 so that it operates at no more than 75% of the maximum number of queued packets. This number should be tuned for network hardware performance to ensure that packets that need to be sent quickly (e.g. NACK packets) do not have to wait long in the network buffer before being transmitted to the appropriate physical network. 126. It should further be appreciated that network buffer 124 and/or packet reconstruction module 182 can alternatively prioritize a NACK 164 such that the resent packet 180 is processed by network buffer 124 prior to sending the other data already stored within network buffer 124 and/or packet reconstruction module 182 can process the resent packet 180 before attempting to reorder or recover any new data packets sent by provider 102. Another advantage of limiting or capping the maximum data that can sit within network buffer 124 is to enable a flow control of data entering and leaving the provider such that congestion of data moving in an out of provider 102 is regulated and limited.

It should be appreciated that the recovery and NACK process outlined above can be implemented with or without data encryption of the packets being sent or received within the system. For example, some or all of the plurality of sequence numbered payload packets 158A-158I and some or all of the plurality of correction packets 160A-160F may be encrypted prior to the provider 102 sending the packets to the receiver 104, and receiver 104 can be configured to decrypt the encrypted packets and proceed with the recovery process outlined above after the decryption occurs. Additionally, the use of the recovery processes which utilize the forward error correction and NACKs as outlined above, can be detected regardless of whether the provider 102 and/or the receiver 104 are sending and receiving encrypted or unencrypted packets. For example, a packet sniffer may be employed over a given network of devices and data regarding packets sniffed may be collected and examined. In one example, in a substantially lossless network, i.e., a network with little or no packet delivery failures, the packets being sent by the provider 102 to the receiver 104 will be mostly unidirectional, e.g., being sent from provider 102 to receiver 104. Additionally, when the lossiness of the network is slightly increased, there will not be a significant change in the traffic pattern as the receiver 104 should still be able to reconstruct any failed packet 166 using the forward error correction recovery processes described herein. However, as network conditions become substantially more lossy, packets with a payload size that is smaller than the payload size of normal packets sent by provider 102 to receiver 104 or sent by receiver 104 to provider 102 can be observed. These smaller packets are indicative of a NACK 164 packet and/or associated resent packet 180 being transmitted from provider 102 to receiver 104 or from receiver 104 to provider 102. The foregoing detection is possible regardless of whether the packets employ any form of encryption.

Figure 13:
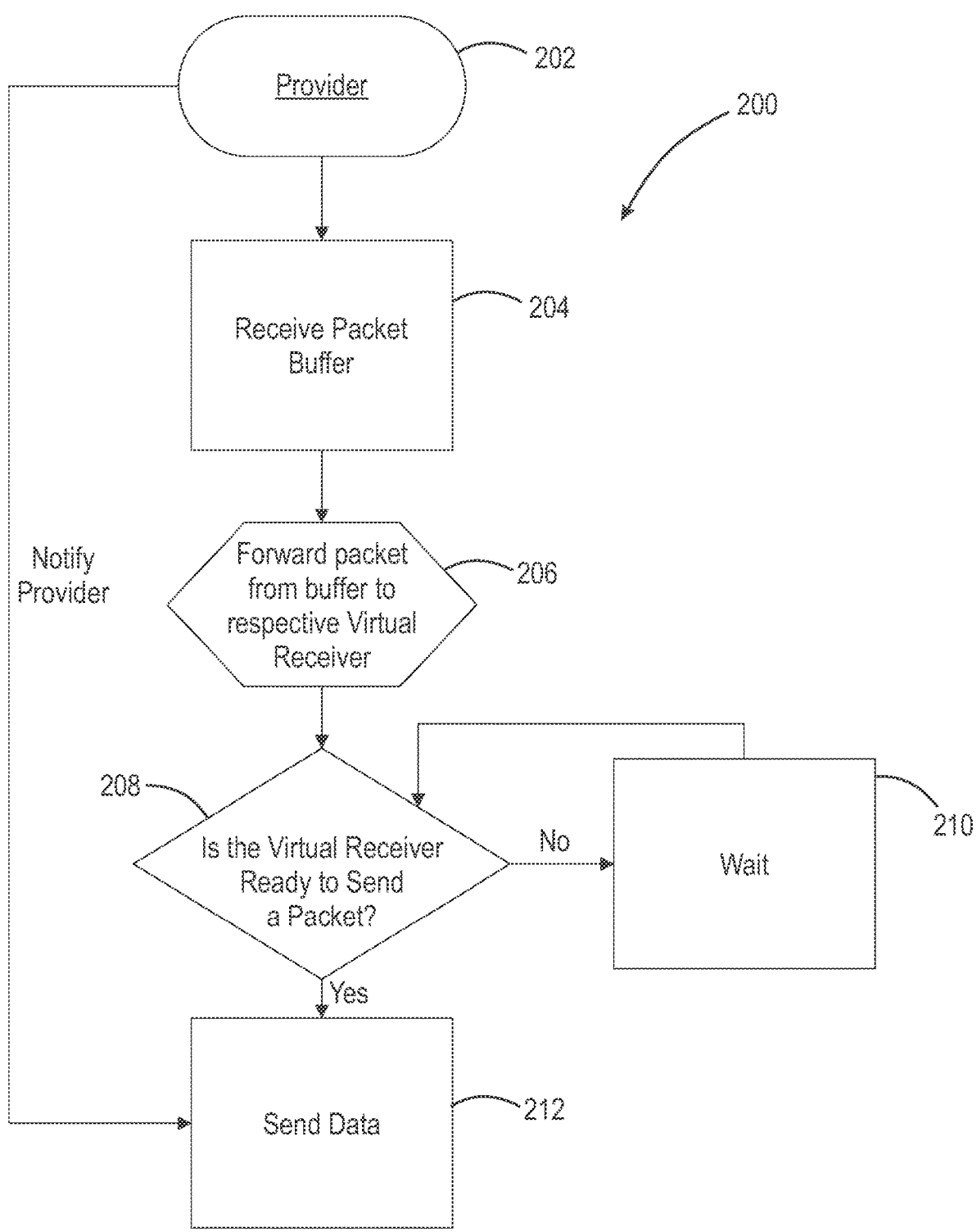
FIG. 13 is a flow chart illustrating the steps associated with the workflow for generating media data packets according to the present disclosure.

FIG. 13 illustrates an example flow chart of the steps of method 200 related to the generation and sending of media data packets 108 from provider 102 to receiver 104. Method 202 can include, for example: generation of processed packets 144 within provider 102 or another device connected to network 112, passing the processed packets 144 containing preemptive packet recovery packet headers 146 and preemptive packet recovery packet payloads 148 and to additional buffer 153 (step 202); receiving from provider 102 a processed packet 144 of plurality of media data packets 108 (step 204); forwarding the processed packet 144 or packets from additional buffer 153 to an available virtual receiver, e.g., first virtual receiver proxy 154 and/or second virtual receiver 156 (step 206); and, determine if the virtual receiver is available to transmit packets (step 208). If the virtual receivers are not available the media system 100 is arranged to wait and recheck availability of the virtual receivers until a socket of at least one virtual receiver is available to accept the processed packet 144(step 210). The maximum wait time that media system 100 is arranged to wait for an available virtual receiver socket to become available is dependent on the latency of receiver buffer 150 (discussed above). If a virtual receiver socket is available, media system 100 can then send the media data 106 and media data packets 108 (e.g., processed packets 144) to receiver 104 corresponding to the available virtual receiver (step 212) over network 112 and notify the provider 102.

Figure 14:
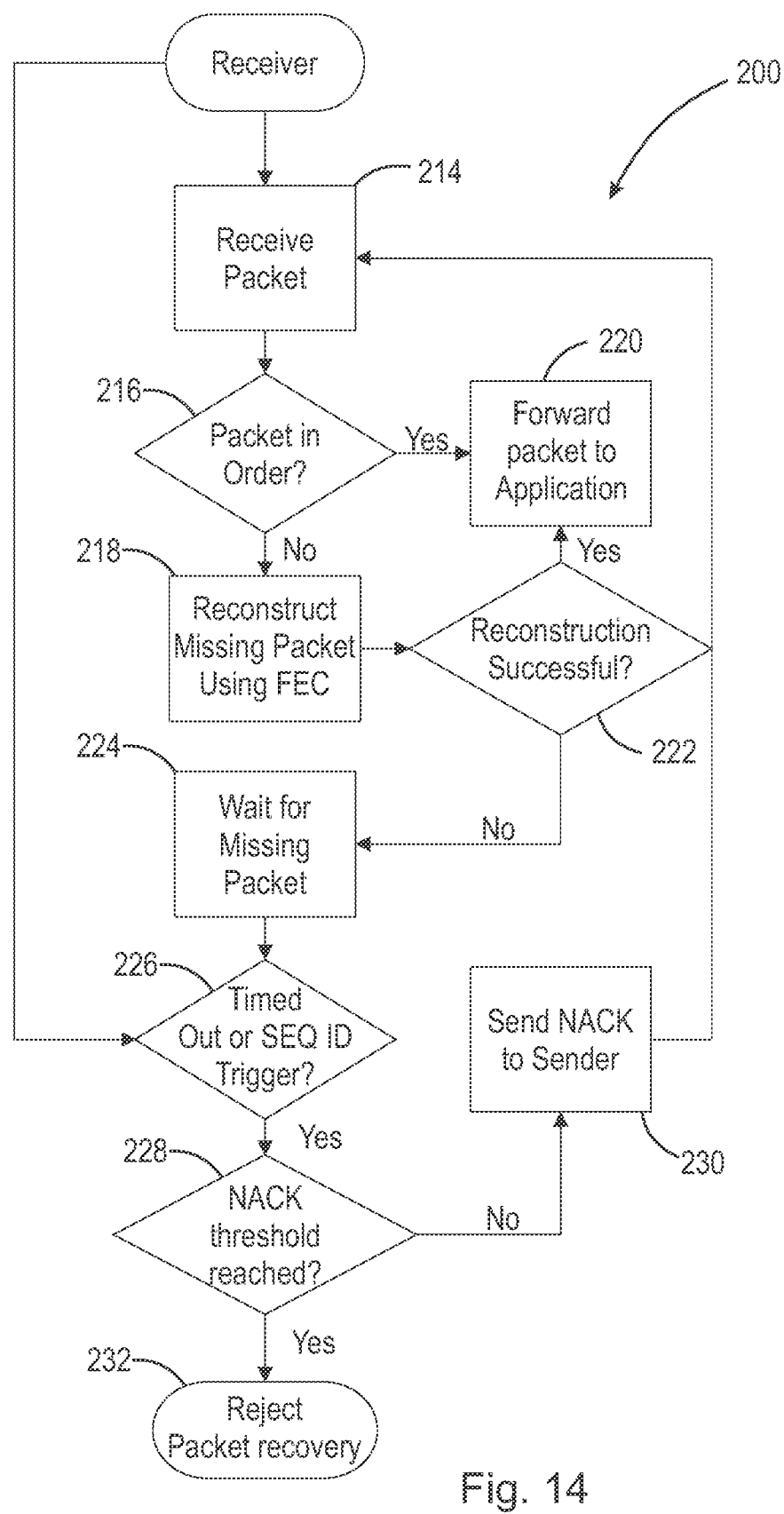
FIG. 14 is a flow chart illustrating the steps associated with the workflow for sending and recovery of media data packets according to the present disclosure.

FIG. 14 illustrates an example flow chart of additional steps of method 200 related to receiving, recovering and potentially sending a NACK 164 in response to receiving media data packets 108 from provider 102. As illustrated, method 200 can further include, for example: receiving a plurality of media data packets 108 from provider 102 (step 214); and, determining if the packets received are in the correct order, e.g., are in the order sent by provider 102 (using the monotonically increasing integer values stores in the preemptive packet recovery packet header 146 discussed above) and are complete (e.g., there are no packets missing) (step 216). If the packets are not all received after being placed in the correct order, packet reconstruction module 182 will attempt to reconstruct the missing packets using the recovery logic discussed above (step 218). Alternatively, if the packets received are all present and in the correct order, receiver 104 is arranged to forward the media data packets to an media rendering service 168 or to an application (step 220). In the event that the recovery process of step 218 is successful in recovering all missing packets the packets can then be forwarded to the media rendering service 168 or application (step 222). If the recovery process is not successful, packet reconstruction module 182 and/or packet reordering module 162 are arranged to wait a predetermined amount of time to see if it will receive any of the missing packets through the normal stream of data coming from provider 102 (step 224). The predetermined amount of time is dependent on the latency of receiver buffer 150 (discussed above.) If the predetermined amount of time elapses without receiving the missing packet or packets, the waiting period times out (step 226) and a determination is as to whether a NACK threshold is reached is made (step 228). The NACK threshold relates to the total number of NACKs sent to provider 102 in an attempt to reobtain a missing packet. For example, media system 100 can be arranged to attempt a total of six NACKs where after each NACK is sent for a particular packet recovery, packet retrieval module 184 is arranged to increment an integer value associated with the number of NACKs sent for a given packet. If the integer value is greater than or equal to six, then the NACK threshold has been met. If the NACK threshold has not been met, a NACK 164 can be sent from the receiver 104 to the provider 102 (step 230). If the NACK threshold is reached, the recovery process times out and the attempt at recovering the missing packets is abandoned (step 232).

Figure 15:
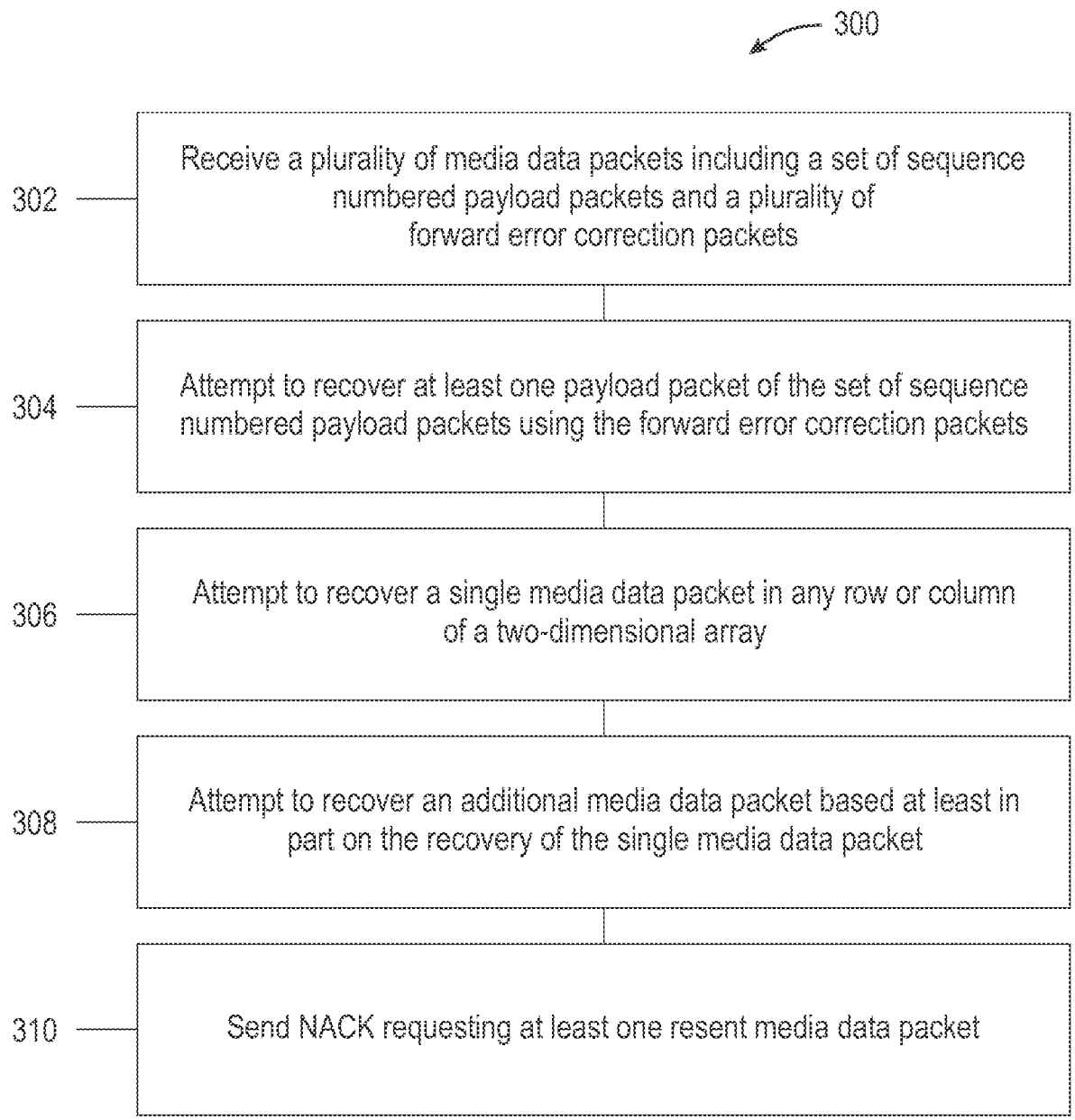
FIG. 15 is a flow chart illustrating the steps of a method according to the present disclosure.

FIG. 15 illustrates the steps of method 300 according to the present disclosure. Method 300 includes, for example: receiving, from a provider 102, a plurality of media data packets 108 that comprise a set of sequence numbered payload packets 158A-158I and one or more correction packets 160A-160F, the one or more correction packets including at least some redundant data relative to the set of payload packets, wherein the one or more correction packets are received without sending a request for those one or more correction packets (step 302); and, attempting to recover at least one sequence numbered payload packet using the one or more correction packets (step 304). The method can further include attempting to recover a single media data packet 158A-158I in any row 172A-172C or any column 174A-174C of a two-dimensional array 170 of media data packets 108 (step 306); and/or, attempting to recover at least one additional media data packet 158A-158I based at least in part on the recovery of the single media data packet 158A-158I (step 308). Method 300 further includes sending, a Negative Acknowledgement 164 (NACK), from a receiver 104 to the provider 102, wherein the NACK 164 includes a request that the provider 102 resend at least one resent media data packet 180 where the at least one resent media data packet 180 was not originally received by the receiver 102 (step 310).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of increasing reliability for media data distribution, the method comprising:

receiving, from a provider, a plurality of media data packets, wherein the plurality of media data packets are received via an unreliable data protocol, and wherein the plurality of media data packets comprise a set of sequence numbered payload packets and a plurality of forward error correction packets, the plurality of forward error correction packets including at least some redundant data relative to the set of payload packets, wherein the plurality of forward error correction packets are received without sending a request for those plurality of forward error correction packets;

attempting to recover a plurality of sequence numbered payload packets of the set of sequence numbered payload packets, each of the plurality of sequence numbered payload packets comprising a failed media data packet, wherein the plurality of media data packets are arranged in a two-dimensional array of media data packets, each media data packet being assigned to a row and a column of the two-dimensional array, wherein each row and each column is associated with a respective forward error correction packet of the plurality of forward error correction packets, wherein attempting to recover the plurality of sequence numbered payload packets comprises attempting to use the forward error correction packets corresponding to the row and the column of each of the plurality of sequence numbered payload packet; and sending a Negative Acknowledgement (NACK) from a receiver to the provider, wherein the NACK includes a request that the provider resend at least one resent media data packet where the at least one resent media data packet comprises one of the plurality of sequence numbered payload packets only if the attempt to recover at least two of the plurality of sequence numbered payload packet using the one or more forward error correction packets fails, wherein the at least one resent media data packet is selected to permit recovery of at least one additional media data packet of the plurality of sequence numbered payload packets using the plurality of forward error correction packets.

2. The method of claim 1, wherein the step of attempting to recover the plurality of sequence numbered payload packet using the one or more forward error correction packets is implemented by a preemptive packet recovery module.

3. The method of claim 1, further comprising determining a need to send the NACK by receiving packets of larger sequence number.

4. The method of claim 1, further comprising determining a need to send the NACK by an expiration of a timeout determined by expected and measured packet transfer times.

5. The method of claim 1 further comprising:
attempting a second recovery of the at least one additional media data packet based at least in part on the at least one resent media data packet.

6. The method of claim 5, wherein the NACK is inserted into a network buffer of the provider, the network buffer having a total capacity wherein the network buffer is arranged to operate at no more than 75% of the maximum number of queued packets.

7. A computer program product stored on a non-transitory computer readable medium which includes a set of non-transitory computer readable instructions for increasing reliability for media data distribution that when executed on a processor of a receiver is arranged to:
receive, from a provider, a plurality of media data packets, wherein the plurality of media data packets are received via an unreliable data protocol, and wherein the plurality of media data packets comprise a set of sequence numbered payload packets and a plurality of forward error correction packets, the plurality of forward error correction packets including at least some redundant data relative to the set of payload packets, wherein the plurality of forward error correction packets are received without sending a request for those plurality of forward error correction packets;
attempt to recover a plurality of sequence numbered payload packets of the set of sequence numbered payload packets, each of the plurality of sequence numbered payload packets comprising a failed media data packet, wherein the plurality of media data packets are arranged in a two-dimensional array of media data packets, each media data packet being assigned to a row and a column of the two-dimensional array, wherein each row and each column is associated with a respective forward error correction packet of the plurality of forward error correction packets, wherein attempting to recover the plurality of sequence numbered payload packets comprises attempting to use the forward error correction packets corresponding to the row and the column of each of the plurality of sequence numbered payload packet; and
send a Negative Acknowledgement (NACK) from a receiver to the provider, wherein the NACK includes a request that the provider resend at least one resent media data packet where the at least one resent media data packet comprises one of the plurality of sequence numbered payload packets only if the attempt to recover at least two of the plurality of sequence numbered payload packet using the one or more forward error correction packets fails, wherein the at least one resent media data packet is selected to permit recovery of at least one additional media data packet of the plurality of sequence numbered payload packets using the plurality of forward error correction packets.

8. The computer program product of claim 7, wherein the attempt to recover the plurality of sequence numbered payload packet using the one or more forward error correction packets is implemented by a preemptive packet recovery module.

9. The computer program product of claim 7, wherein the processor is further arranged to:
attempt a second recovery of at the least one additional media data packet based at least in part on the at least one resent media data packet.

10. The computer program product of claim 3, wherein the NACK is inserted into a network buffer of the provider, the network buffer having a total capacity wherein the network buffer is arranged to operate at no more than 75% of the maximum number of queued packets.

11. A system for increasing reliability for media distribution comprising:
a provider arranged within a network, the provider arranged to send a plurality of media data packets using only an unreliable data protocol the plurality of media data packets comprising a set of sequence numbered payload packets and a plurality of forward error correction packets, the plurality of forward error correction packets including at least some redundant data relative to the set of payload packets, wherein the plurality of forward error correction packets are received without sending a request for those plurality of forward error correction packets; and
a receiver arranged with the network, the receiver arranged to receive at least one sequence numbered payload packet and the one or more forward error correction packets, the receiver further arranged to attempt to recover a plurality of sequence numbered payload packets of the set of sequence numbered payload packets, each of the plurality of sequence numbered payload packets comprising a failed packet, wherein the plurality of media data packets are arranged in a two-dimensional array of media data packets, each media data packet being assigned to a row and a column of the two-dimensional array, wherein each row and each column is associated with a respective forward error correction packet of the plurality of forward error correction packets, wherein attempting to recover the plurality of sequence numbered payload packets comprises attempting to use the forward error correction packets corresponding to the row and the column of each of the plurality of sequence numbered payload packet,
wherein the receiver is further arranged to send a Negative Acknowledgement (NACK) to the provider, wherein the NACK includes a request that the provider resend at least one resent media data packet where the at least one resent media data packet comprises one of the plurality of sequence numbered payload packets only if the attempt to recover at least two of the plurality of sequence numbered payload packet using the one or more forward error correction packets fails, wherein the at least one resent media data packet is selected to permit recovery of at least one additional media data packet of the plurality of sequence numbered payload packets using the plurality of forward error correction packets.

12. The system of claim 11, wherein the attempt to recover the at least one sequence numbered payload packet using the one or more forward error correction packets is implemented by a preemptive packet recovery module within the receiver.

\* \* \* \* \*